US 9,317,949 B2

(12) United States Patent
Miyamoto

(10) Patent No.: US 9,317,949 B2
(45) Date of Patent: Apr. 19, 2016

(54) STRING ARRANGEMENT DEVICE

(75) Inventor: Ken Miyamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 80 days.

(21) Appl. No.: 14/000,292

(22) PCT Filed: Mar. 14, 2011

(86) PCT No.: PCT/JP2011/001477
§ 371 (c)(1),
(2), (4) Date: Aug. 19, 2013

(87) PCT Pub. No.: WO2012/123986
PCT Pub. Date: Sep. 20, 2012

(65) Prior Publication Data
US 2013/0321429 A1 Dec. 5, 2013

(51) Int. Cl.
G06T 11/60 (2006.01)
G09B 29/10 (2006.01)
G06T 11/20 (2006.01)

(52) U.S. Cl.
CPC .............. *G06T 11/60* (2013.01); *G06T 11/203* (2013.01); *G09B 29/106* (2013.01)

(58) Field of Classification Search
CPC ............. G06T 11/203; G06T 2207/10016; G06T 9/20; G06F 17/17; G09G 5/20; G09G 5/24; G06K 15/02; G06K 9/22; G06K 9/186; G06K 9/00456; G06K 9/48; G06K 9/481
USPC ......... 345/418, 441, 442, 443, 467, 468, 469; 382/181, 186, 190, 192, 198, 200, 201, 382/202, 203, 232, 242, 245
See application file for complete search history.

(56) References Cited

U.S. PATENT DOCUMENTS 4,523,294 A * 6/1985 Winn ................................ 400/3
5,109,352 A * 4/1992 O'Dell ........................ 715/262
(Continued)

FOREIGN PATENT DOCUMENTS

JP 4-326478 A 11/1992
JP 6-259525 A 9/1994
(Continued)

OTHER PUBLICATIONS

International Search Report issued May 17, 2011, in PCT/JP2011/001477.

Primary Examiner — Xiao Wu
Assistant Examiner — Sarah Lhymn
(74) Attorney, Agent, or Firm — Oblon, McClelland, Maier & Neustadt, L.L.P.

(57) ABSTRACT

A string arrangement device includes: a character string arrangement data acquisition unit for acquiring character string arrangement data for arranging a character string along a road; a control point sequence creation unit for creating a control point sequence from a road node sequence included in the character string arrangement data acquired by the character string arrangement data acquisition unit; a curve approximation unit for creating a node sequence obtained by approximating with a straight line a curve from the control point sequence created by the control point sequence creation unit; a curve approximation node sequence storage unit for storing the node sequence created by the curve approximation unit as a curve approximation node sequence; and a character string arrangement processing unit for performing arrangement processing of the character string based on the curve approximation node sequence stored in the curve approximation node sequence storage unit.

7 Claims, 16 Drawing Sheets

(56) References Cited

U.S. PATENT DOCUMENTS

| | | | | |
|---|---|---|---|---|
| 5,241,654 | A | * | 8/1993 | Kai et al. .................. 345/442 |
| 5,408,598 | A | * | 4/1995 | Pryor, Jr. .................. 345/442 |
| 5,590,247 | A | * | 12/1996 | Mikuni .................... 358/1.11 |
| 6,278,445 | B1 | * | 8/2001 | Tanaka et al. .............. 345/178 |
| 2001/0000965 | A1 | * | 5/2001 | Yano ....................... 345/469 |
| 2001/0040984 | A1 | * | 11/2001 | Kambe ................. G01C 21/20 382/113 |
| 2005/0089237 | A1 | * | 4/2005 | Park et al. ................. 382/242 |
| 2007/0040835 | A1 | * | 2/2007 | Hayasaka et al. ........... 345/442 |
| 2007/0091375 | A1 | * | 4/2007 | Manabe .................... 358/3.26 |
| 2008/0243369 | A1 | * | 10/2008 | Hayashi et al. ............. 701/200 |
| 2011/0058028 | A1 | * | 3/2011 | Sakai ................. G06K 9/00288 348/77 |

FOREIGN PATENT DOCUMENTS

| | | |
|---|---|---|
| JP | 8-194432 A | 7/1996 |
| JP | 2000-29450 A | 1/2000 |
| JP | 2002-297025 A | 10/2002 |
| JP | 2008-76593 A | 4/2008 |

* cited by examiner

STRING ARRANGEMENT DEVICE

TECHNICAL FIELD

The present invention relates to a string arrangement device for arranging character strings such as road names on a map.

BACKGROUND ART

Conventionally, there has been known a car navigation system equipped with a character string arrangement function of arranging a character string such as a road name along a road line (hereinafter referred to as a "road node sequence") from a node for starting an arrangement of the character string (hereinafter referred to as an "arrangement start node") (for example, see Patent Document 1 to Patent Document 3). When the character string arrangement function is used, characters are arranged in parallel with the road; thus, when a character string extending over two links is arranged, a change in angle between road links (hereinafter referred to as a "road angular change") becomes equal to a change in arrangement angle between characters (hereinafter referred to as a "character angular change").

PRIOR ART DOCUMENTS

Patent Documents

Patent Document 1: Japanese Patent Application Laid-open No. 2008-76593 (JP-A-2008-76593)
Patent Document 2: Japanese Patent Application Laid-open No. 2000-29450 (JP-A-2000-29450)
Patent Document 3: Japanese Patent Application Laid-open No. H6-259525 (JP-A-1994-259525)

SUMMARY OF THE INVENTION

Problems to be Solved by the Invention

For the character string displayed using the character string arrangement function in the conventional string arrangement device discussed above, the road angular change and the character angular change are equal to each other; thus, with an increase in the road angular change, the character angular change also increases, which poses a problem of the degradation of the readability of the character string.

The present invention is made in order to solve the problem, and an object of the invention is to provide a string arrangement device in which the readability of the character string is improved.

Means for Solving the Problems

A string arrangement device in accordance with this invention includes: a character string arrangement data acquisition unit for acquiring character string arrangement data for arranging a character string along a road; a control point sequence creation unit for creating a control point sequence from a road node sequence included in the character string arrangement data acquired by the character string arrangement data acquisition unit; a curve approximation unit for creating a node sequence obtained by approximating with a straight line a curve from the control point sequence created by the control point sequence creation unit; a curve approximation node sequence storage unit for storing the node sequence created by the curve approximation unit as a curve approximation node sequence; and a character string arrangement processing unit for performing arrangement processing of the character string based on the curve approximation node sequence stored in the curve approximation node sequence storage unit.

Effect of the Invention

According to the string arrangement device of this invention, when a character string is arranged on a curve created from road links, a character angular change thereof can be reduced to thereby enhance the readability of the character string.

BEST MODE FOR CARRYING OUT THE INVENTION

Hereinafter, embodiments in the present invention will be described in detail with reference to the accompanying drawings. Embodiment 1.

Figure 1:
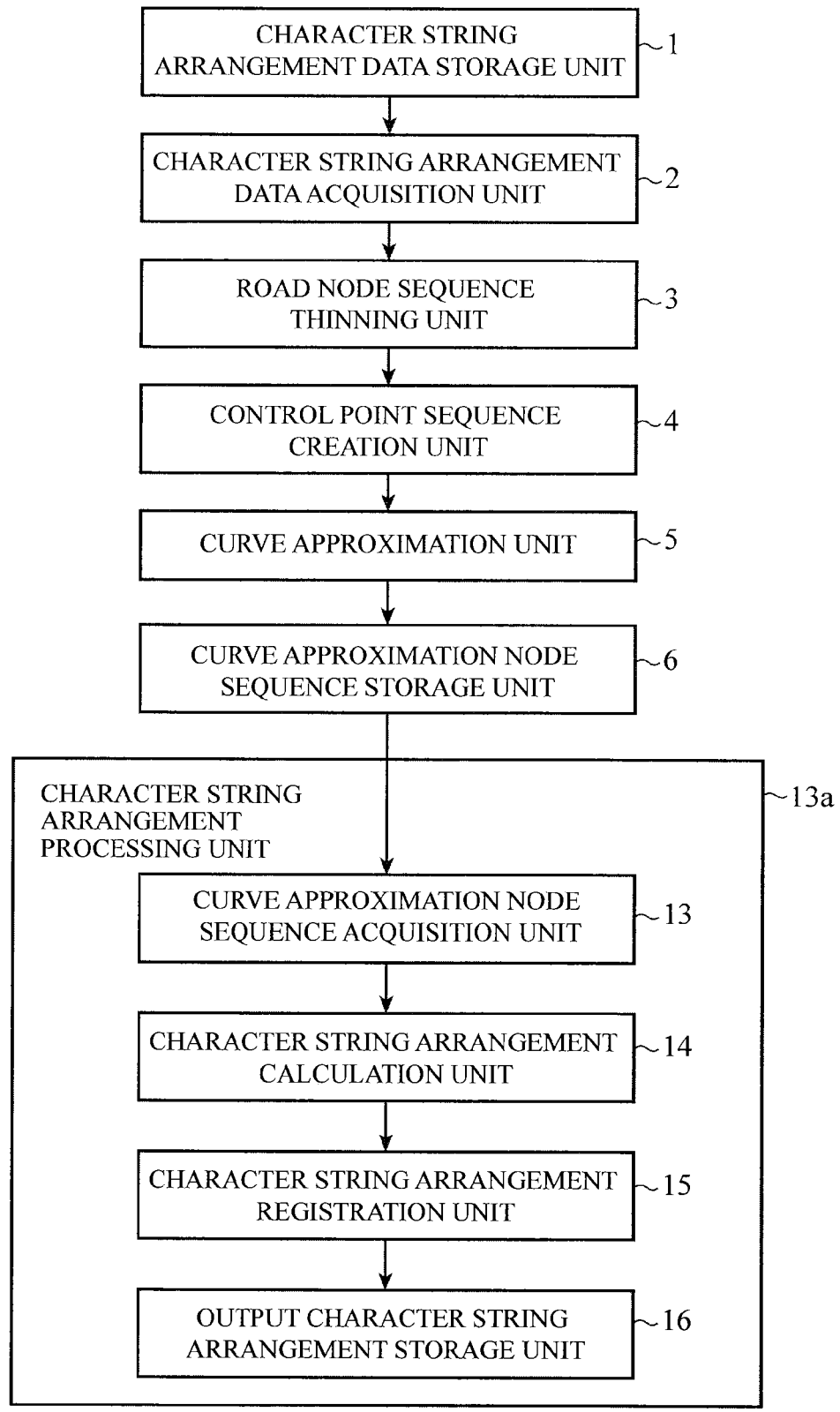
FIG. 1 is a block view showing a configuration of a string arrangement device in accordance with Embodiment 1 of this invention.

FIG. 1 is a block view showing a configuration of a string arrangement device in accordance with Embodiment 1 of this invention. The string arrangement device includes a character string arrangement data storage unit 1, a character string arrangement data acquisition unit 2, a road node sequence thinning unit 3, a control point sequence creation unit 4, a curve approximation (curve fitting) unit 5, a curve approximation node sequence storage unit 6, and a character string arrangement processing unit 13a. Further, the character string arrangement processing unit 13a includes a curve approximation node sequence acquisition unit 13, a character string arrangement calculation unit 14, a character string arrangement registration unit 15, and an output character string arrangement storage unit 16.

The character string arrangement data storage unit 1 stores character string arrangement data. The character string arrangement data includes data that represent a plurality of characters forming a character string, a longitudinal width and a transverse width of each character, a road node sequence along which the character string extends, and an arrangement start node of the character string. The character string arrangement data stored in the character string arrangement data storage unit 1 is read by the character string arrangement data acquisition unit 2.

The character string arrangement data acquisition unit 2 reads and acquires the character string arrangement data from the character string arrangement data storage unit 1. The character string arrangement data acquired at the character string arrangement data acquisition unit 2 is fed to the road node sequence thinning unit 3.

The road node sequence thinning unit 3 thins out some of the nodes forming the road node sequence included in the character string arrangement data fed from the character string arrangement data acquisition unit 2. The road node sequence after thinning out of some of the nodes at the road node sequence thinning unit 3 is fed to the control point sequence creation unit 4. The thinning out at the road node sequence thinning unit 3 can smoothen the locus of the character string.

The control point sequence creation unit 4 creates a control point sequence for generating a curve from the road node sequence along which the character string extends, fed from the road node sequence thinning unit 3. The control point sequence created at the control point sequence creation unit 4 is fed to the curve approximation unit 5.

The curve approximation unit 5 creates the curve from the control point sequence fed from the control point sequence creation unit 4, and linearly approximates the created curve to generate a node sequence. The node sequence generated at the curve approximation unit 5 is fed as a curve approximation node sequence to the curve approximation node sequence storage unit 6. When the curve created from the road link at the curve approximation unit 5 is approximated with a straight line, it is possible to speed up the character arrangement. The details of the curve approximation unit 5 will be described later.

The curve approximation node sequence storage unit 6 stores the curve approximation node sequence fed from the curve approximation unit 5. The curve approximation node sequence stored in the curve approximation node sequence storage unit 6 is read by a curve approximation node sequence acquisition unit 13. The curve approximation node sequence acquisition unit 13 reads and acquires the curve approximation node sequence from the curve approximation node sequence storage unit 6. The curve approximation node sequence acquired at the curve approximation node sequence acquisition unit 13 is fed to the character string arrangement calculation unit 14.

The character string arrangement calculation unit 14 calculates an arrangement position (position to be arranged) of the character string based on the curve approximation node sequence fed from the curve approximation node sequence acquisition unit 13. The arrangement position of the character string calculated by the character string arrangement calculation unit 14 is fed to the character string arrangement registration unit 15. The details of the character string arrangement calculation unit 14 will be described later.

The character string arrangement registration unit 15 registers the arrangement position of the character string fed from the character string arrangement calculation unit 14 at the output character string arrangement storage unit 16 when the determination result fed from the character string arrangement calculation unit 14 indicates that a predetermined number of characters has been reached. The output character string arrangement storage unit 16 stores the arrangement position of the character string registered by the character string arrangement registration unit 15.

Figure 2:
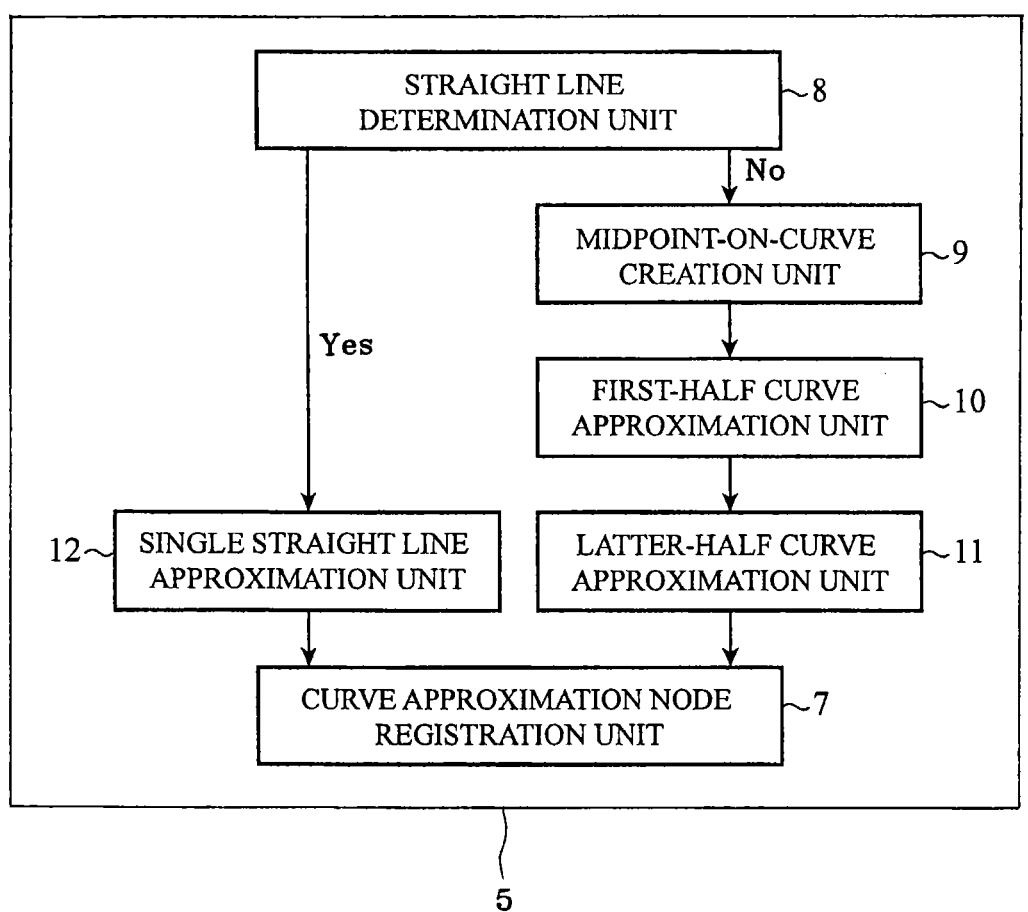
FIG. 2 is a block view showing a detailed configuration of a curve approximation unit of the string arrangement device in accordance with Embodiment 1 of this invention.

Next, the details of the aforementioned curve approximation unit 5 will be described. FIG. 2 is a block view showing a detailed configuration of the curve approximation unit 5. The curve approximation unit 5 includes a curve approximation node registration unit 7, a straight line determination unit 8, a midpoint-on-curve creation unit 9, a first-half curve approximation unit 10, a latter-half curve approximation unit 11, and a single straight line approximation unit 12.

The curve approximation node registration unit 7 registers the curve approximation node sequence fed from the latter-half curve approximation unit 11 or the single straight line approximation unit 12 at the curve approximation node sequence storage unit 6. The straight line determination unit 8 determines whether or not the curve created from the control point sequence fed from the control point sequence creation unit 4 can be approximated with a straight line, in other words, whether or not the curve is close to a straight line. When the curve is determined not close to a straight line at the straight line determination unit 8, the sequence shifts to processing at the midpoint-on-curve creation unit 9. When the curve is determined close to a straight line, the sequence shifts to processing at the single straight line approximation unit 12.

The midpoint-on-curve creation unit 9 creates a midpoint on the curve created from the control point sequence fed from the control point sequence creation unit 4. The midpoint created at the midpoint-on-curve creation unit 9 is fed to the first-half curve approximation unit 10 and the latter-half curve approximation unit 11. The first-half curve approximation unit 10 approximates the curve preceding the midpoint fed from the midpoint-on-curve creation unit 9 out of the curve created from the control point sequence fed from the control point sequence creation unit 4 with a straight line. The node sequence created by linear approximation at the first-half curve approximation unit 10 is fed to the latter-half curve approximation unit 11.

The latter-half curve approximation unit 11 approximates the curve following the midpoint fed from the midpoint-on-curve creation unit 9 out of the curve created from the control point sequence fed from the control point sequence creation unit 4 with a straight line. The node sequence created by linear approximation at the latter-half curve approximation unit 11 is connected to the node sequence fed from the first-half curve approximation unit 10, and is fed as a curve approximation node sequence to the curve approximation node registration unit 7.

The single straight line approximation unit 12 approximates the curve created from the control point sequence fed from the control point sequence creation unit 4 with one straight line. The node sequence created by linear approximation at the single straight line approximation unit 12 is fed as a curve approximation node sequence to the curve approximation node registration unit 7.

Figure 3:
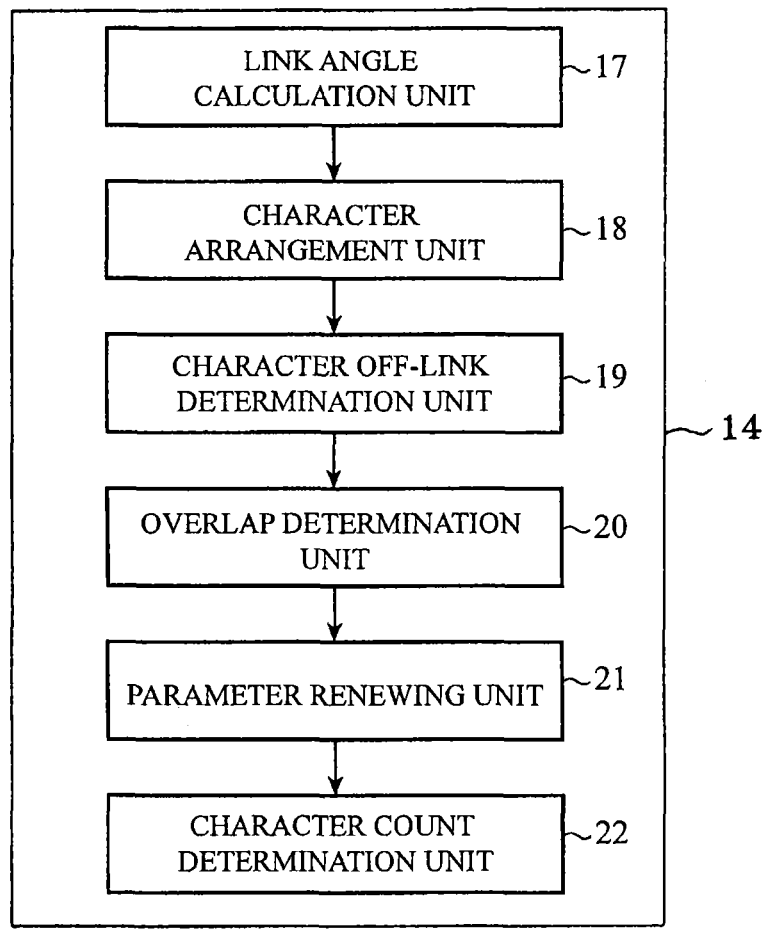
FIG. 3 is a block view showing a detailed configuration of a character string arrangement calculation unit of the string arrangement device in accordance with Embodiment 1 of this invention.

Next, the details of the character string arrangement calculation unit 14 will be described. FIG. 3 is a block view showing a detailed configuration of the character string arrangement calculation unit 14. The character string arrangement calculation unit 14 includes a link angle calculation unit 17, a character arrangement unit 18, a character off-link determination unit 19, an overlap determination unit 20, a parameter renewing unit 21, and a character count determination unit 22.

The link angle calculation unit 17 calculates an angle formed between links at each node (hereinafter referred to as "a link angle") based on the curve approximation node sequence fed from the curve approximation node sequence acquisition unit 13. The link angle calculated at the link angle calculation unit 17 is fed to the character arrangement unit 18.

The character arrangement unit 18 arranges characters based on the link angle fed from the link angle calculation unit 17. The characters arranged at the character arrangement unit 18 are fed to the character off-link determination unit 19. The details of the character arrangement unit 18 will be described later. The character off-link determination unit 19 determines whether the character fed from the character arrangement unit 18 is off-link or not. The determination result at the character off-link determination unit 19 is fed to the overlap determination unit 20.

The overlap determination unit 20 determines whether the characters overlap each other or not based on the determination result fed from the character off-link determination unit 19. The determination result at the overlap determination unit 20 is fed to the parameter renewing unit 21. The parameter renewing unit 21 renews the parameter for use in the character string arrangement according to the determination result fed from the overlap determination unit 20. The parameter renewed at the parameter renewing unit 21 is fed to the character count determination unit 22.

The character count determination unit 22 refers to the parameter fed from the parameter renewing unit 21, and determines whether a predetermined character count has been reached or not. The determination result at the character count determination unit 22 is fed to the character string arrangement registration unit 15.

Figure 4:
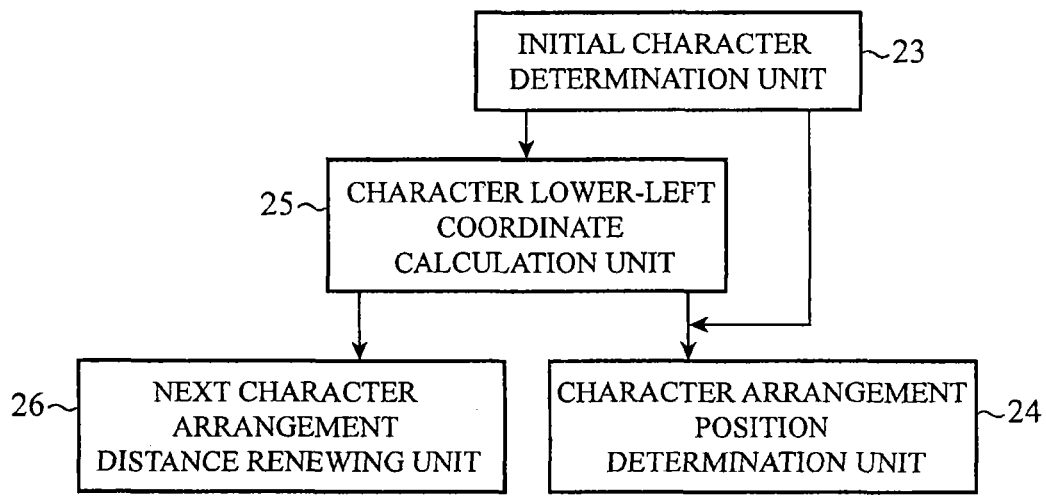
FIG. 4 is a block view showing a detailed configuration of a character arrangement unit of the string arrangement device in accordance with Embodiment 1 of this invention.

Next, the details of the character arrangement unit 18 will be described. FIG. 4 is a block view showing a detailed configuration of the character arrangement unit 18. The character arrangement unit 18 includes an initial character determination unit 23, a character arrangement position determination unit 24, a character lower-left coordinate calculation unit 25, and a next character arrangement distance renewing unit 26.

The initial character determination unit 23 determines whether the character arranged based on the link angle fed from the link angle calculation unit 17 is the first character in the character string or not. The determination result at the initial character determination unit 23 is fed to the character arrangement position determination unit 24 and the character lower-left coordinate calculation unit 25.

The character arrangement position determination unit 24 determines the arrangement position of the character according to the determination result fed from the initial character determination unit 23, or according to the lower-left coordinate of the character calculated at the character lower-left coordinate calculation unit 25. The arrangement position determined at the character arrangement position determination unit 24 is fed to the character off-link determination unit 19.

The character lower-left coordinate calculation unit 25 calculates the lower-left coordinate of the character according to the determination result fed from the initial character determination unit 23. The lower-left coordinate of the character calculated at the character lower-left coordinate calculation unit 25 is fed to the character arrangement position determination unit 24 or the next character arrangement distance renewing unit 26. The next character arrangement distance renewing unit 26 determines the distance to the next character based on the lower-left coordinate of the character calculated at the character lower-left coordinate calculation unit 25, and renews the character spacing. The character spacing renewed at the next character arrangement distance renewing unit 26 is fed to the character off-link determination unit 19.

Figure 5:
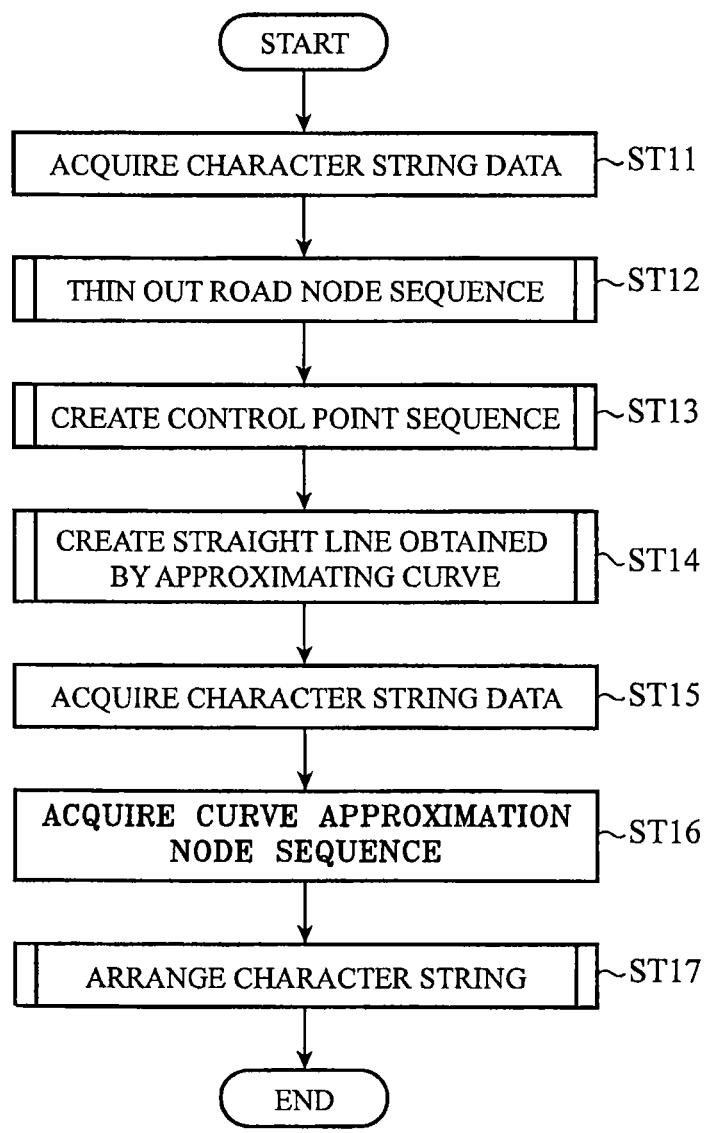
FIG. 5 is a flowchart showing an operation of the string arrangement device in accordance with Embodiment 1 of this invention.

Next, a description will be given to the operation of the string arrangement device in accordance with Embodiment 1 configured as described above. FIG. 5 is a flowchart showing the operation of the string arrangement device.

In Embodiment 1, as one example, a description is given based on the following: the character string arrangement data includes the transverse width and the longitudinal width of each character in the character string "String", and the road node sequence along which the character string "String" extends; the longitudinal width and the transverse width of each character in the character string "String" are 10 and 5, respectively; the road node sequence along which the character string "String" extends includes: P (1)=(0, 10), P (2)=(5, 10), P (3)=(10, 10), P (4)=(50, 10), and P (5)=(10, 50); and the node for starting the arrangement of the character string is P (1)=(0, 10)

Figure 6:
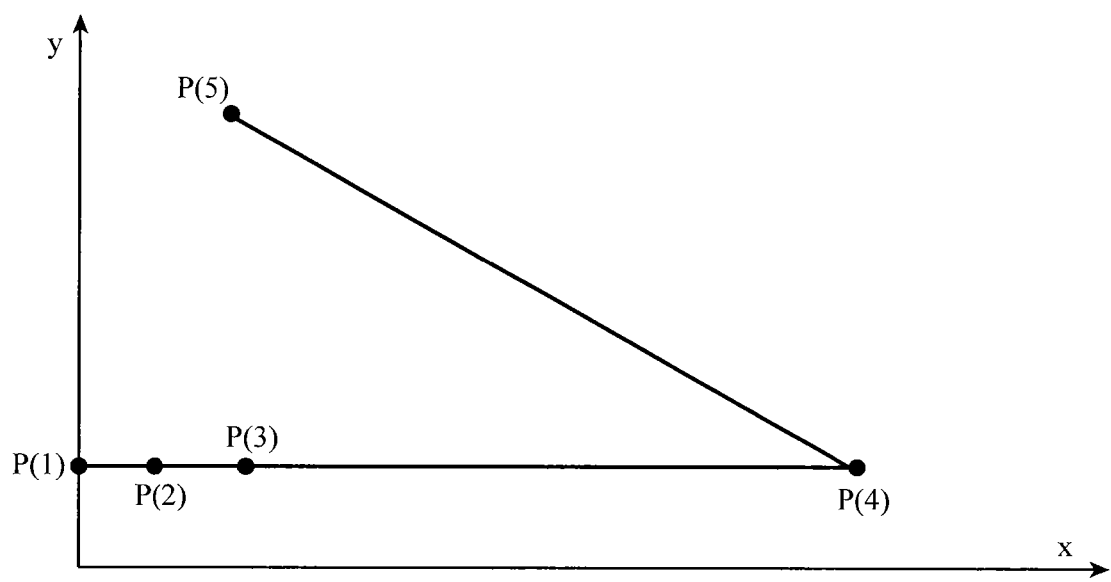
FIG. 6 is a view showing an example of a relation between nodes and links in a road node sequence to be processed in the string arrangement device in accordance with Embodiment 1 of this invention.

Further, although the details will be described later, the following is assumed: SEPARATE_NUM indicating the number of links in a case where a curve is linearly approximated is 2; SEPARATE_THRESHOLD which is the boundary of the distance for use in the determination of whether the curve is approximated with one link or the curve is approximated with a plurality of links is 15; STRAIGHT_THRESHOLD which is the boundary of the change in angle for use in the determination of whether the curve is approximated with one link or the curve is approximated with a plurality of links is 10; CULLING_THRESHOLD which is the boundary of the distance for determining whether thinning out is right or wrong is 10; and STEP_SIZE which is the increment of "range" is 1. FIG. 6 shows an example of a relation between nodes and links in the road node sequence.

When the operation of the string arrangement device is started, first, character string data is acquired (Step ST11). Namely, the character string arrangement data acquisition unit 2 reads character string arrangement data from the character string arrangement data storage unit 1, and acquires the road node sequence along which the character string extends, and the arrangement start node of the character string. In this example, there are acquired the road node sequence along which the character string "String" extends, and the node for starting the arrangement of the character string "String".

Figure 7:
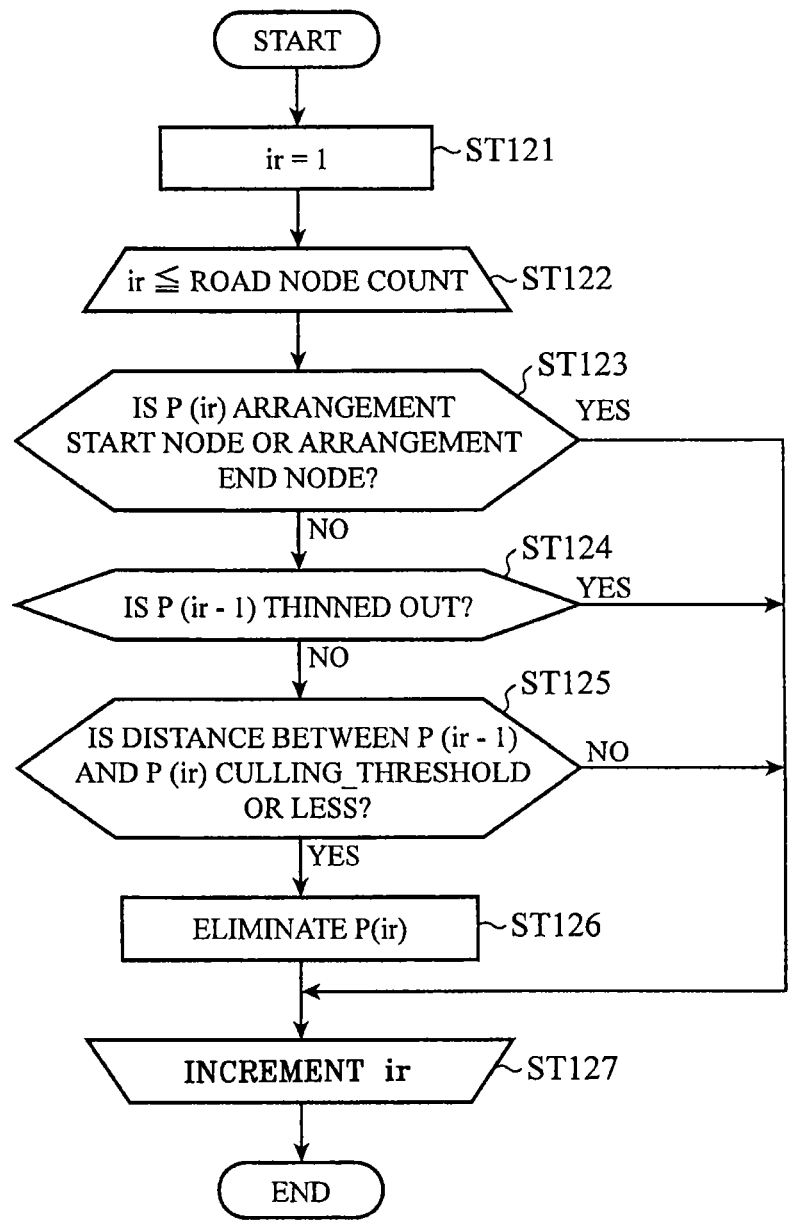
FIG. 7 is a flowchart showing thinning processing of a road node sequence to be performed at a road node sequence thinning unit of the string arrangement device in accordance with Embodiment 1 of this invention.

Then, the road node sequence is thinned out (Step ST12). Namely, the road node sequence thinning unit 3 thins out some of the nodes forming the road node sequence included in the character string arrangement data acquired at the character string arrangement data acquisition unit 2 in order to create a smooth curve. Here, the details of the thinning processing of the road node sequence performed at the road node sequence thinning unit 3 will be described by reference to a flowchart shown in FIG. 7.

In the thinning processing of the road node sequence, the nodes included in the road node sequence are sequentially scanned, and the nodes satisfying all the following three conditions are thinned out from the road node sequence.

(1) The node is not the arrangement start node or arrangement end node of the road node sequence;
(2) The previous node is not thinned out; and
(3) The distance from the previous node is CULLING_THRESHOLD or less.

When the thinning processing of the road node sequence is started, first, a variable ir is initialized to 1 (Step ST121). Then, when the variable ir is a road node count or less, the loop is started (Step ST122). When the loop is started, first, it is examined whether the node P (ir) is the arrangement start node or arrangement end node (Step ST123). Namely, the road node sequence thinning unit 3 examines whether the node P (ir) in the road node sequence included in the character string arrangement data fed from the character string arrangement data acquisition unit 2 is the arrangement start node or arrangement end node. In Step ST123, when the node P (ir) is determined to be the arrangement start node or arrangement end node, (1) of the three conditions is not satisfied; thus, thinning out of the node P (ir) is not performed, and the sequence proceeds to Step ST127.

In the above Step ST123, if the node P (ir) is determined not to be the arrangement start node or the arrangement end node, then, it is examined whether the node P (ir−1) has been thinned out, or not (Step ST124). Namely, the road node sequence thinning unit 3 examines whether the immediately previous node P (ir−1) has been thinned out or not. In Step ST124, when the node P (ir−1) is determined to have been thinned out, (2) of the three conditions is not satisfied; accordingly, thinning out of the node P (ir) is not performed, and the sequence proceeds to Step ST127.

In the above Step ST124, if it is determined that the node P (ir−1) has not been thinned out, then, it is examined whether or not the distance between the node P (ir−1) and the node P (ir) is CULLING_THRESHOLD or less (Step ST125). Namely, the road node sequence thinning unit 3 examines whether or not the distance between the previous node P (ir−1) and the current node P (ir) is CULLING_THRESHOLD (10 in this example) or less. In Step ST125, if it is determined that the distance between the node P (ir−1) and the node P (ir) is not CULLING_THRESHOLD or less, (3) of the three conditions is not satisfied. Accordingly, thinning out of the node P (ir) is not performed. The sequence proceeds to Step ST127.

On the other hand, in Step ST125, if it is determined that the distance between the node P (ir−1) and the node P (ir) is CULLING_THRESHOLD or less, it is recognized that all the three conditions have been satisfied. Then, elimination of the node P (ir) is performed (Step ST126). Namely, the road node sequence thinning unit 3 thins out the node (ir) in the road node sequence included in the character string arrangement data fed from the character string arrangement data acquisition unit 2. Then, the sequence proceeds to Step ST127. In Step ST127, the variable ir is incremented. Below, the processes between Step ST122 and Step ST127 are repeated until the variable ir becomes larger than the road node count.

By the above repeating processes, the nodes P (1) to P (5) are processed as follows. First, whether thinning out of the node P (1) is right or wrong is studied. Here, since the node P (1) is the arrangement start node of the road node sequence, it is not thinned out. Then, whether thinning out of the node P (2) is right or wrong is studied. Here, the node P (2) is not the arrangement start node or the arrangement end node of the road node sequence; the previous node P (1) has not been thinned out; and the distance between the node P (1) and the node P (2) is 5, and is equal to or less than 10 which is CULLING_THRESHOLD. Therefore, all the three conditions are satisfied, and hence the node P (2) is thinned out.

Then, whether thinning out of the node P (3) is right or wrong is studied. Here, the node P (3) is not the arrangement start node or the arrangement end node of the road link. However, the previous node P (2) has been thinned out, and hence the node P (3) is not thinned out. Below, in the similar manner, the node P (4) and subsequent ones also are processed.

Figure 8:
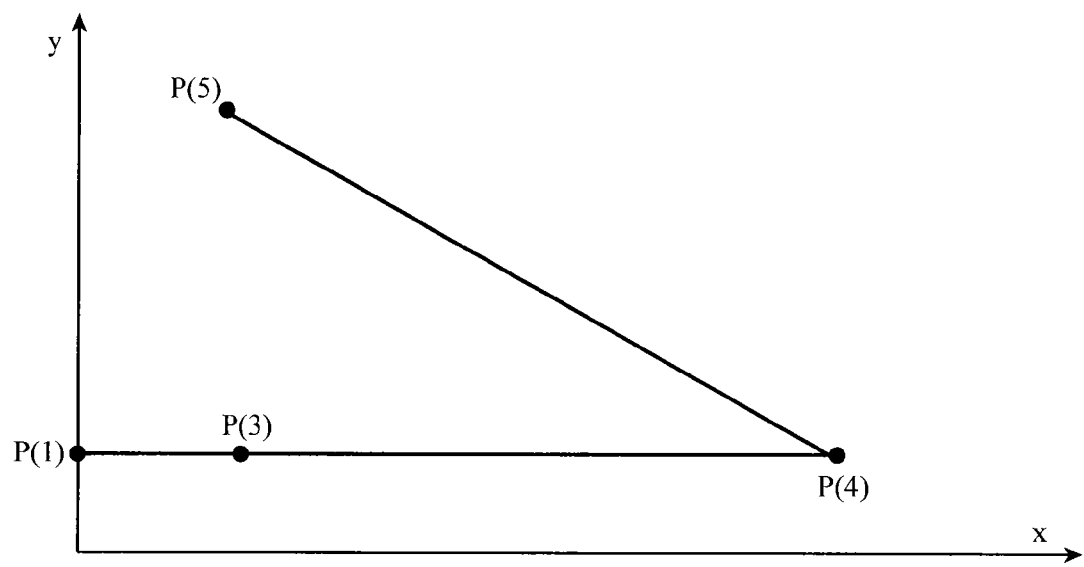
FIG. 8 is a view showing an example of a relation between the nodes and links in the road node sequence after the thinning processing performed in the string arrangement device in accordance with Embodiment 1 of this invention.
Figure 9:
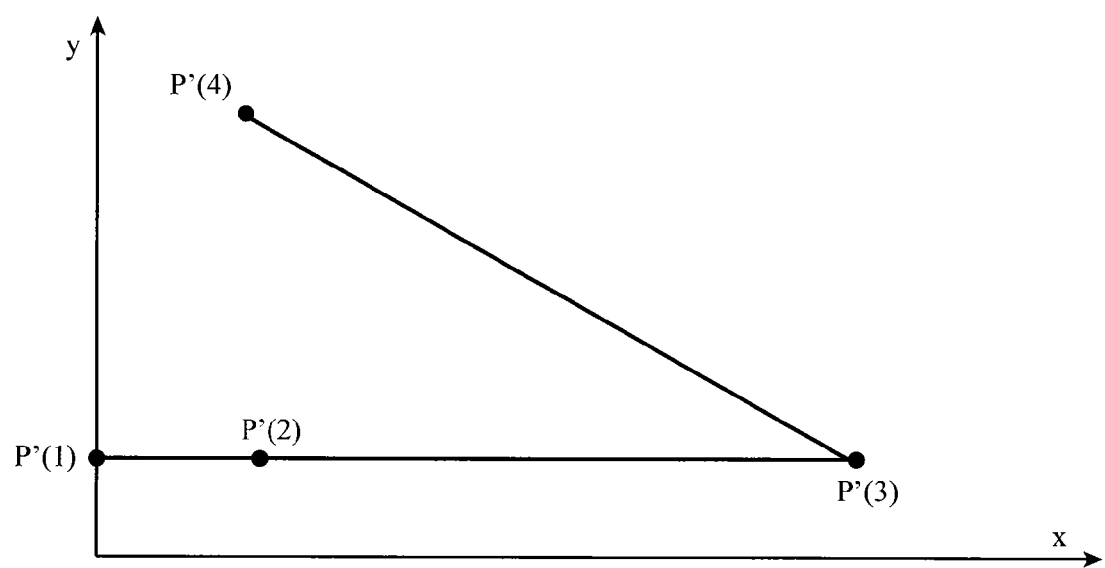
FIG. 9 is a view showing an example of a relation between the nodes and links in the road node sequence to be processed after the thinning processing in the string arrangement device in accordance with Embodiment 1 of this invention.

As a result of the above processes, as shown in FIG. 8, there is created a road node sequence from which the node P (2) has been tinned out, in other words, a road node sequence including the nodes P (1), P (3), P (4), and P (5). Here, as shown in FIG. 9, the road node sequence P (1), P (3), P (4), and P (5) after thinning out are referred to as P' (1), P' (2), P' (3), and P' (4), respectively. Thus, the subsequent processes will be described.

Figure 10:
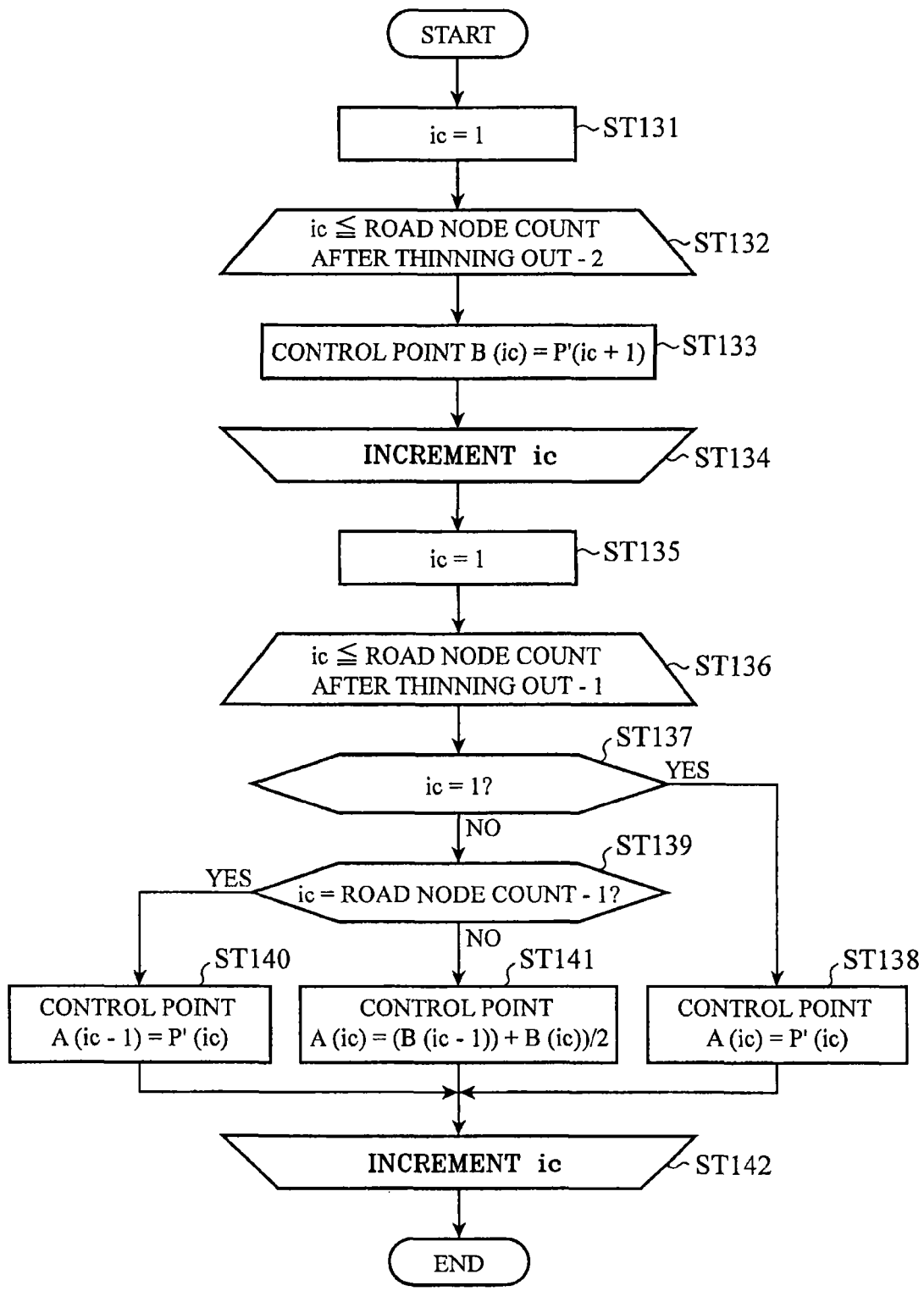
FIG. 10 is a flowchart showing control point sequence creation processing to be performed at a control point sequence creation unit at the string arrangement device in accordance with Embodiment 1 of this invention.

Upon termination of the above thinning processing of the road node sequence, subsequently, as shown in the flowchart of FIG. 5, the control point sequence is created (Step ST13). Namely, the control point sequence creation unit 4 creates the control point sequence from the road node sequence after thinning out. Here, the details of the creation processing of the control point sequence will be described by reference to a flowchart of FIG. 10.

In the creation processing of the control point sequence, first, a control point sequence B (ic) {ic=1, . . . , the road node count after thinning out−2} is set. Particularly, first, a variable ic is initialized to 1 (Step ST131). Then, if the variable ic is the "road node count after thinning out−2" or less, the loop is started (Step ST132). When the loop is started, a control point B (ic) is calculated according to the following equation (1) (Step ST133). Then, the sequence proceeds to Step ST134.

$$B(ic)=P'(ic+1) \qquad (1)$$

wherein ic=1, . . . , the road node count after thinning out−2.

In Step ST134, the variable ic is incremented. Below, until the variable ic becomes larger than the "road node count−2 after thinning out," the processes between Step ST132 and Step ST134, in other words, the process of Step ST133 will be repeated.

In the above repeating processes, the road node count after thinning out=4, resulting in a control point B (1)=P' (2)=(10, 10), and a control point B (2)=P' (3)=(50, 10).

Then, a control point sequence A (ic) {ic=1, . . . , the road node count after thinning out−1} is set. Particularly, first, the variable ic is initialized to 1 (Step ST135). Then, if the variable ic is "road node count after thinning out−1" or less, the loop is started (Step ST136). When the loop is started, first, it is examined whether the variable ic is 1 or not (Step ST137). In Step ST137, if the variable ic is determined to be 1, then, a control point A (ic)=P' (ic) is set (Step ST138). Then, the sequence proceeds to Step ST142.

In the above Step ST137, if the variable ic is determined to be not 1, then, it is examined whether the variable ic is a "road node count−1" or not (Step ST139). In Step ST139, if the variable ic is determined to be a "road node count−1," the control point A (ic−1)=P' (ic) is set (Step ST140). Then, the sequence proceeds to Step ST142.

On the other hand, in Step ST139, if the variable ic is determined to be not "road node count−1," control point A (ic)=(B (ic−1)+B (ic))/2 is set (Step ST141). Then, the sequence proceeds to Step ST142. In Step ST142, the variable ic is incremented. Below, until the variable ic becomes larger than the "road node count after thinning out−1," the processes between Step ST136 and Step ST142 are repeated.

By the above repeating processes, the control point A (ic) is changed in the set value according to the value of the variable ic as shown below. First, when ic=1, at the control point A (ic), the node P' (1) is set. When the variable ic is a "road node count−1," at a control point A (ic−1), a node P' (ic) is set. When the variable ic is neither 1 nor "road node count after thinning out−1," the midpoint between the control points B (ic) and B (ic−1) is set at the control point A (ic).

Figure 11:
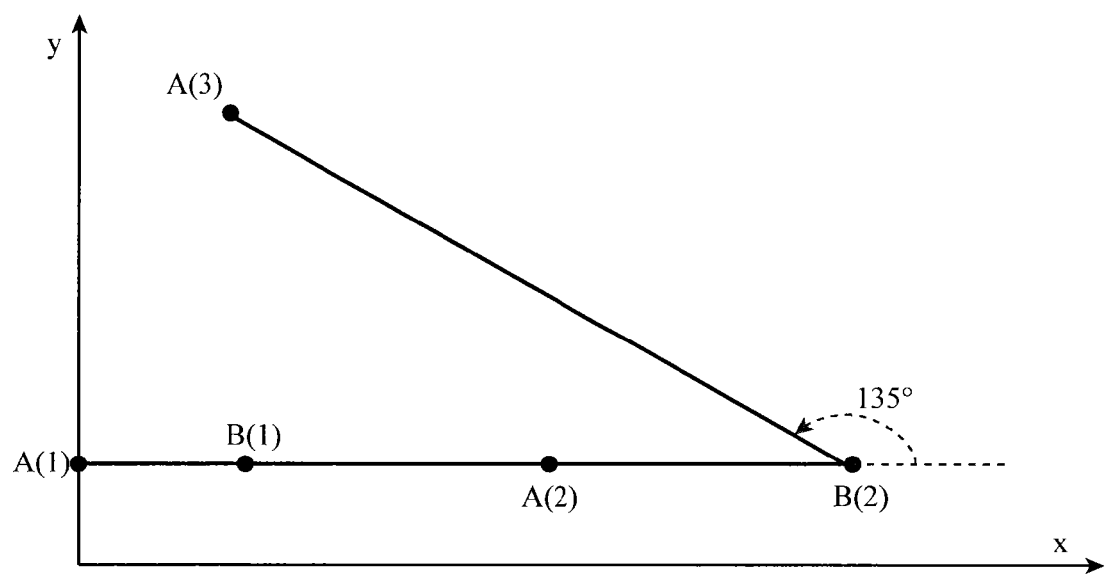
FIG. 11 is a view showing an example of the control point sequence determined at the control point sequence creation processing performed at the control point sequence creation unit of the string arrangement device in accordance with Embodiment 1 of this invention.

As a result of the above processes, first, a control point A (1) is set. At the control point A (1), the node P' (1) is set because ic=1. Then, a control point A (2) is set. The control point A (2) becomes the midpoint (30, 10) between the control points B (1) and B (2) because ic≠1, 3. Then, a control point A (3) is set. At the control point A (3), a node P' (4) is set because ic=3. In such a way, as shown in FIG. 11, the control point sequence A (1), A (2), and A (3), and the control point sequence B (1) and B (2) are determined.

Figure 12:
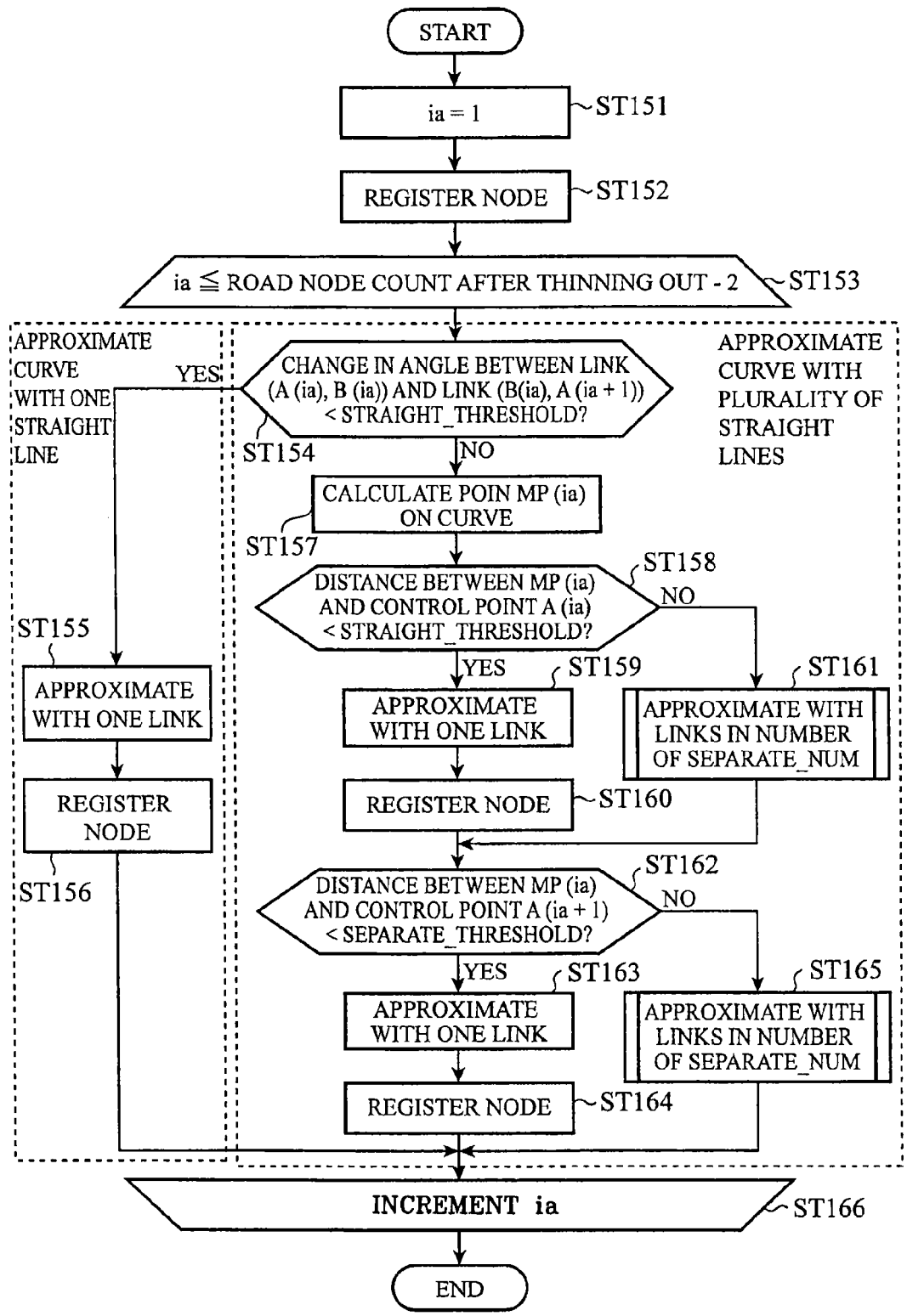
FIG. 12 is a flowchart showing curve approximation node sequence creation processing to be performed at a curve approximation unit of the string arrangement device in accordance with Embodiment 1 of this invention.

Upon termination of the above creation processes of the control point sequences, then, as shown in the flowchart of FIG. 5, a straight line approximating a curve is created (Step ST14). Namely, the curve approximation unit 5 creates the straight line approximating the curve from the control point sequences. Here, the details of the creation processes of the straight line approximating the curve (hereinafter, a curve approximation node sequence) performed at the curve approximation unit 5 will be described by reference to a flowchart shown in FIG. 12.

In the creation processes of the curve approximation node sequence, first, a variable ia is initialized to 1 (Step ST151). Then, the nodes are registered (Step ST152). Namely, the curve approximation node registration unit 7 stores the control point A (1) in the curve approximation node sequence storage unit 6. In this case, A (1)=(0, 10) is stored in the curve approximation node sequence storage unit 6.

Figure 13:
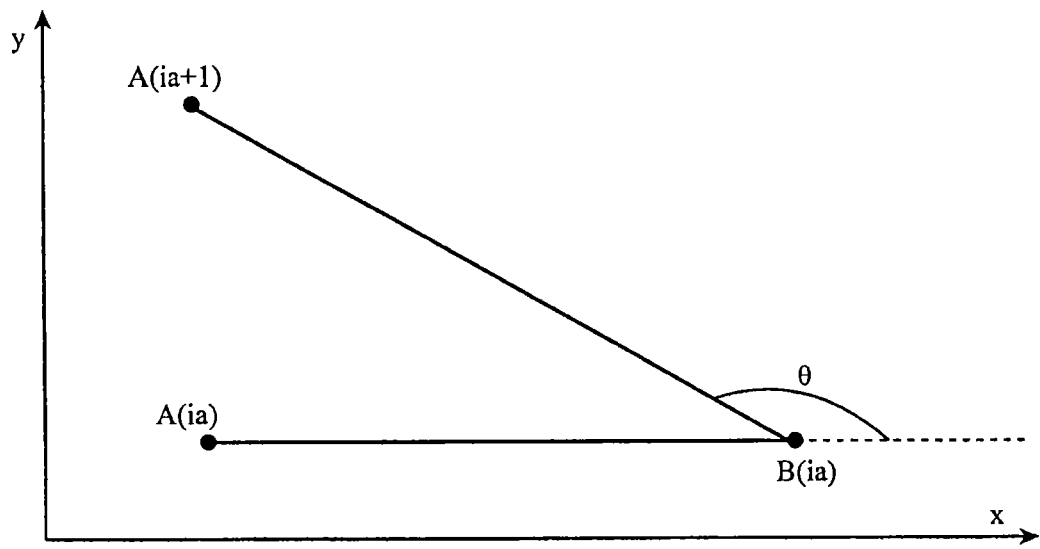
FIG. 13 is an explanatory view for illustrating the curve approximation node sequence creation processing to be performed in the string arrangement device in accordance with Embodiment 1 of this invention.

Then, if the variable ia is the "road node count after thinning out−2" or less, the loop is started (Step ST153). When the loop is started, it is examined whether the angular change between the link (A (ia), B (ia)) and the link (B (ia), A (ia+1))<STRAIGHT_THRESHOLD or not (Step ST154). Namely, the straight line determination unit 8 determines whether the secondary Bezier curve created by the control points A (ia), B (ia), and A (ia+1) (hereinafter simply referred to as "Bezier curve") can be approximated with a straight line, or not. Specifically, first, it is determined whether the angular change between the link (A (ia), B (ia)) and the link (B (ia), A (ia+1)) is less than STRAIGHT_THRESHOLD or not. Incidentally, the variable ia represents the index of the control point sequence, and the angular change θ between the link (A (ia), B (ia)) and the link (B (ia), A (ia+1)) is, as shown in FIG. 13, the absolute value of the difference between the orientation of the link (A (ia), B (ia)) and the orientation of the link (B (ia), A (ia+1)). Here, the orientation of the link (A (ia), B (ia)) is the deviation angle when it is assumed that the x axis is at 0° (zero degree), and that the y axis is at 90° (90 degrees).

In this example, when the variable is 1, as shown in FIG. 11, the orientation of the link (A (1), B (1)) is 0°, and the orientation of the link (B (1), A (2)) is also 0°. Accordingly, the angular change between the link (A (1), B (1)) and the link (B (1), A (2)) becomes 0°, resulting in the determination of YES in Step ST154.

In the above Step ST154, if it is determined that the angular change between the link (A (ia), B (ia)) and the link (B (ia), A (ia+1))<STRAIGHT_THRESHOLD, the curve is approximated with one link (Step ST155). Namely, the single straight line approximation unit 12 approximates the Bezier curve created of the control points A (ia), B (ia), and A (ia+1) with the link (A (ia), A (ia+1)). In this example, the Bezier curve created of the control points A (1), B (1), and A (2) is approximated with the link (A (1), A (2)).

Then, the nodes are registered (Step ST156). Namely, the curve approximation node registration unit 7 stores nodes other than the already registered A (1) out of the links fed from the single straight line approximation unit 12 as curve approximation nodes in the curve approximation node sequence storage unit 6. In this example, the control point A (2) is stored. Then, the sequence proceeds to Step ST166.

In Step ST154, if it is determined that the angular change between the link (A (ia), B (ia)) and the link (B (ia), A (ia+1)) is not smaller than STRAIGHT_THRESHOLD, the sequence proceeds to Step ST157. In this example, the sequence enters the next loop. If the variable is becomes 2, the straight line determination unit 8 examines whether the angular change between the link (A (2), B (2)) and the link (B (2), A (3)) is less than STRAIGHT_THRESHOLD, or not. The orientation of the link (A (2), B (2)) is 0° (zero degree), and the orientation of the link (B (2), A (3)) is 135° (135 degrees). Accordingly, it is determined that the angular change between the link (A (2), B (2)) and the link (B (2), A (3)) is STRAIGHT_THRESHOLD or more. Therefore, in Step ST154, it is determined as NO, so that the sequence proceeds to Step ST157. There is performed processing of approximating the Bezier curve created of the control points A (2), B (2), and A (3) with a plurality of straight lines.

Specifically, in Step ST157, the point MP (ia) which is the midpoint on the curve is calculated. Namely, the midpoint-on-curve creation unit 9 calculates the point MP (ia) on the Bezier curve according to the following equation (2). In this example, substitution of A (2)=(30, 10), B (2)=(50, 10), and A (3)=(10, 50) into the equation (2) yields an on-curve point MP (2)=(35, 20).

$$MP(ia)=(1-0.5)^2 A(ia)+2(1-0.5)\cdot 0.5B(ia)+0.5^2 A(ia+1) \quad (2)$$

Then, it is examined whether the distance between the on-curve point MP (ia) and the control point A (ia)<SEPARATE_THRESHOLD, or not (Step ST158). Namely, the first-half curve approximation unit 10 examines whether the distance Dist1 between the control point A (ia) and the on-curve point MP (ia) determined by the following equation (3) is smaller than SEPARATE_THRESHOLD, or not.

In Step ST158, if it is determined that the distance between the on-curve point MP (ia) and the control point A (ia) <SEPARATE_THRESHOLD, the curve is approximated with one link (Step ST159). Namely, the single straight line approximation unit 12 approximates the Bezier curve between the control point A (ia) and the on-curve point MP (ia) with one link (A (ia), MP (ia)).

Then, the nodes are registered (Step ST160). Namely, the curve approximation node registration unit 7 stores the nodes approximated with one link, fed from the single straight line approximation unit 12 in the curve approximation node sequence storage unit 6. Then, the sequence proceeds to Step ST162.

On the other hand, in Step ST158, if it is determined that the distance between the on-curve point MP (ia) and the control point A (ia) is not smaller than SEPARATE_THRESHOLD, namely, if it is determined that the distance Dist1 is SEPARATE_THRESHOLD or more, the Bezier curve between the control point A (ia) and the on-curve point MP (ia) is approximated with links in a number indicated by SEPARATE_NUM (Step ST161).

Figure 14:
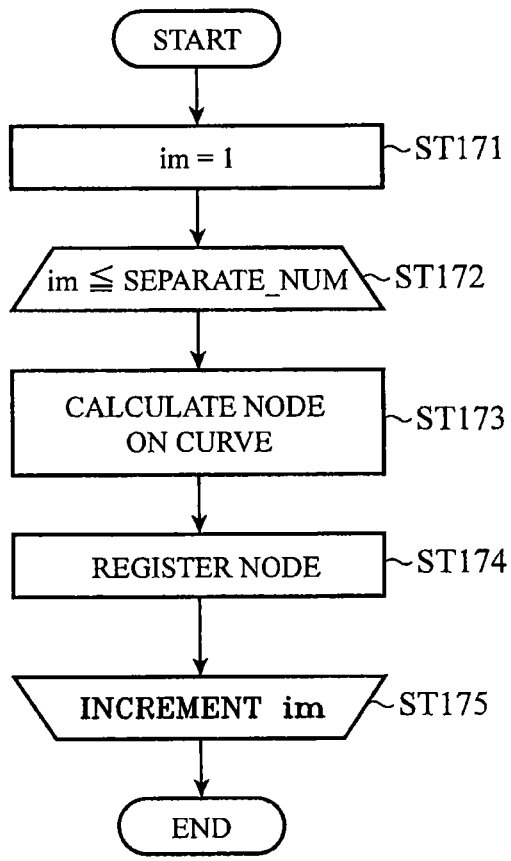
FIG. 14 is a flowchart particularly showing a part of the curve approximation node sequence creation processing to be performed in the string arrangement device in accordance with Embodiment 1 of this invention.

The details of the processing performed in Step ST161 will be described by reference to the flowchart shown in FIG. 14. In this processing, first, the variable im is initialized to 1 (Step ST171). Then, if the variable im is SEPARATE_NUM or less, the loop is started (Step ST172). Upon start of the loop, first, the on-curve nodes are calculated (Step ST173). Namely, the first-half curve approximation unit 10 calculates the on-curve nodes between the on-curve point MP (ia) and the control point A (ia) according to the following expression (4).

$$Dist1=\|A(ia)-MP(ia)\| \quad (3)$$

$$BP(ia,im)=(1-t(im))^2 A(ia)+2(1-t(im))t(im)B(ia)+t(im)^2 A(ia+1) \quad (4)$$

$$t(im)=0.5\times im/\text{SEPARATE\_NUM} \quad (5)$$

wherein t (im) in the equation (4) is the value showing in the equation (5), BP (ia, im) is an im-th node created on the Bezier curve between the control point A (ia) and the on-curve point MP (ia).

Then, the nodes are registered (Step ST174). Namely, the curve approximation node registration unit 7 registers other on-curve nodes than the already registered nodes of the nodes calculated at the first-half curve approximation unit 10 at the curve approximation node sequence storage unit 6. Then, the variable im is incremented (Step ST175). Hereinafter, until the variable im becomes larger than SEPARATE_NUM, the processes between Step ST172 and Step ST175 are repeated. In the repeating processes, if the variable im becomes larger than SEPARATE_NUM, the sequence proceeds to Step ST162 shown in FIG. 12.

In this case, Dist1 is 11.18, and is SEPARATE_THRESHOLD or less. Therefore, the curve between the control point A (2) and the on-curve point MP (2) is approximated with the link (A (2), MP (2)). In this case, in the registration of the node, the on-curve point MP (2) is stored.

In Step ST162, it is examined whether the distance between the on-curve point MP (ia) and the control point A (ia+1)<SEPARATE_THRESHOLD, or not. Namely, the latter-half curve approximation unit 11 examines whether the distance Dist2 between the on-curve point MP (ia) and the control point A (ia+1) calculated according to the following equation (6) is smaller than SEPARATE_THRESHOLD or not.

In Step ST162, if it is determined that the distance between the on-curve point MP (ia) and the control point A (ia+1) <SEPARATE_THRESHOLD, the curve is approximated with one link (Step ST163). Namely, the single straight line approximation unit 12 approximates the Bezier curve between the on-curve point MP (ia) and the control point A (ia+1) with one link (MP (ia), A (ia)).

Then, the nodes are registered (Step ST164). Namely, the curve approximation node registration unit 7 stores the nodes approximated with one link fed from the single straight line approximation unit 12 in the curve approximation node sequence storage unit 6. Then, the sequence proceeds to Step ST166.

On the other hand, in Step ST162, if it is determined that the distance between the on-curve point MP (ia) and the control point A (ia+1) is not smaller than SEPARATE_THRESHOLD, namely, the distance Dist2 is SEPARATE_THRESHOLD or more, the Bezier curve between the on-curve point MP (ia) and the control point A (ia+1) is approximated with links in a number indicated by SEPARATE_NUM (Step ST165). Then, the sequence proceeds to Step ST166.

The details of the processing performed at the Step ST165 will be described by reference to the flowchart shown in FIG. 14. In this processing, first, the variable im is initialized to 1 (Step ST171). Then, if the variable im is SEPARATE_NUM or less, the loop is started (Step ST172). Upon start of the loop, first, the on-curve nodes are calculated (Step ST173). Namely, the first-half curve approximation unit 10 calculates the on-curve nodes between the on-curve point MP (ia) and the control point A (ia) according to the equation (4).

$$Dist2=\|MP(ia)-A(ia+1)\| \quad (6)$$

$$t(im)=0.5\times im/\text{SEPARATE\_NUM}+0.5 \quad (7)$$

Here, t (im) in the equation (4) is the value shown in the equation (7), and BP (ia, im) at this time is the im-th node created on the Bezier curve between the on-curve point MP (ia) and the control point A (ia+1).

Then, the nodes are registered (Step ST174). Namely, the curve approximation node registration unit 7 registers other on-curve nodes than the already registered nodes out of the nodes calculated at the latter-half curve approximation unit 11 in the curve approximation node sequence storage unit 6. Then, the variable im is incremented (Step ST175). Hereinafter, until the variable im becomes larger than SEPARATE_NUM, the processes between Step ST172 and Step ST175 are repeated. Then, the sequence proceeds to Step ST166.

In this case, Dist2 is 26.9, and SEPARATE_THRESHOLD or more. Therefore, the curve between the on-curve point MP (2) and the control point A (ia+1) is approximated with links in a number of SEPARATE_NUM. Specifically, first, the node of im=1 is calculated. From the equation (7), t (1)=0.75, and BP (2, 1)=(26.25, 32.5). Then, BP (2, 1) is stored in the curve approximation node sequence storage unit 6. Then, BP (2, 2) is calculated. Similarly, from t(2)=1 determined by the equation (7), BP (2, 2)=(10, 50) is calculated. Then, BP (2, 2) is stored in the curve approximation node sequence storage unit 6.

In Step ST166, the variable ia is incremented. Hereinafter, until the variable ia becomes larger than "road node count after thinning out–2", the processes between Step ST153 and Step ST166 are repeated. The curve approximation nodes obtained by linearly approximating the curve created from the control point sequence in this manner are sequentially stored in the curve approximation node sequence storage unit 6.

Incidentally, the first-half curve approximation unit 10 and the latter-half curve approximation unit 11 perform the same processes except for the calculation method of t (im). For this reason, the processes are equal between when the distance between MP (ia) of the first-half curve approximation unit 10 and the control point A (ia) is SEPARATE_THRESHOLD or more, and when the distance between MP (ia) of the latter-half curve approximation unit 11 and the control point A (ia+1) is equal to and larger than SEPARATE_THRESHOLD.

Upon termination of the above creation processing of the straight line approximating the curve, then, as shown in the flowchart of FIG. 5, character string data is acquired (Step ST15). Namely, the character string arrangement data acquisition unit 2 reads character string arrangement data from the character string arrangement data storage unit 1, and acquires a plurality of characters forming one character string, and the longitudinal width and the transverse width of each character. In this case, there are acquired the characters "S", "t", "r", "i", "n", and "g" of the character string "String", and the longitudinal width and the transverse width of each character in "String".

Figure 15:
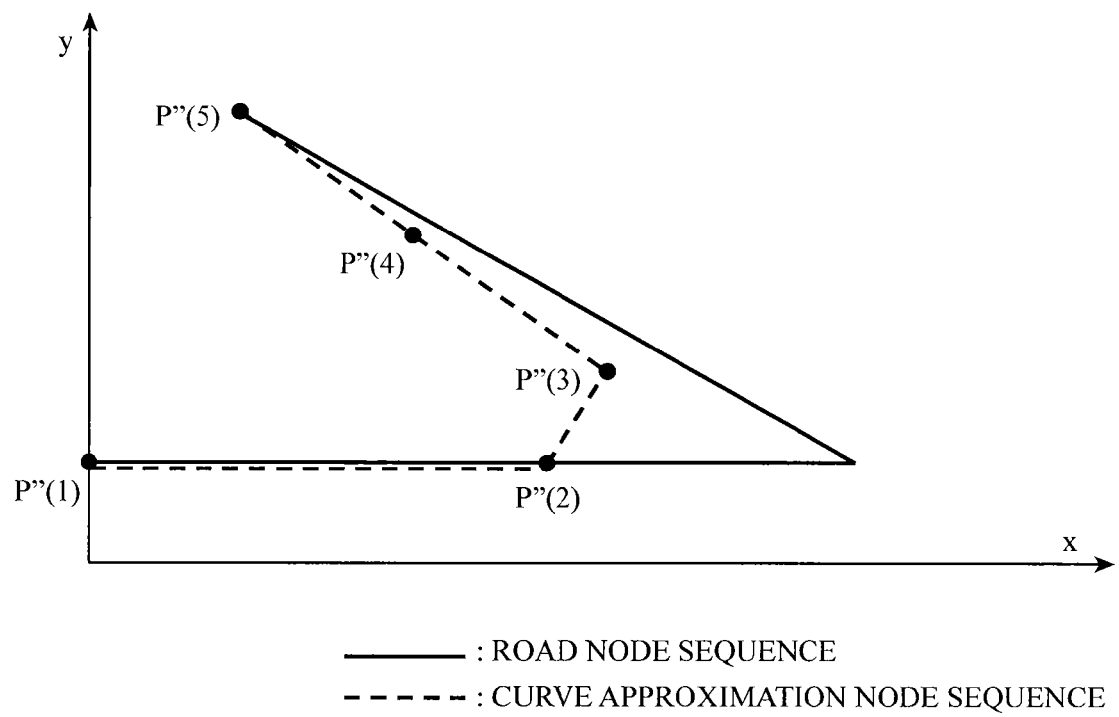
FIG. 15 is a view showing a relation between a road node sequence and a curve approximation node sequence acquired after curve approximation by the string arrangement device in accordance with Embodiment 1 of this invention.

Then, the curve approximation node sequence is acquired (Step ST16). Namely, the curve approximation node sequence acquisition unit 13 acquires the curve approximation node sequence from the curve approximation node sequence storage unit 6. In this case, the nodes P''' (1)=(0, 10), P''' (2)=(30, 10), P''' (3)=MP (2)=(35, 20), P''' (4)=BP (2, 1)=(26.25, 32.5), and P''' (5)=BP (2, 2)=(10, 50) registered in the foregoing processes are acquired. FIG. 15 shows the relation between the acquired curve approximation node sequence and the road node sequence.

Then, the character string is arranged (Step ST17). Namely, the character string arrangement calculation unit 14 arranges the character string. Here, the details of the character string arrangement processing by the character string arrangement calculation unit 14 will be described by reference to a flowchart shown in FIG. 16.

In the character string arrangement processing by the character string arrangement calculation unit 14, first, initialization is performed to parameters ip=1, is=1, and range=0 (Step ST181). Then, if the parameter ip is equal to or smaller than "the number of the curve approximation node sequence–1", the loop is started (Step ST182). Upon start of the loop, then, within the loop, further, the endless loop is started (Step ST183). Upon start of the endless loop, then, the orientation θ' of the link is calculated (Step ST184). Namely, the link angle calculation unit 17 calculates the orientation θ' of the link (P''' (ip), P''' (ip+1)). In this example, it results that the orientation θ' of the link (P''' (1), P''' (2))=0°.

Figure 17:
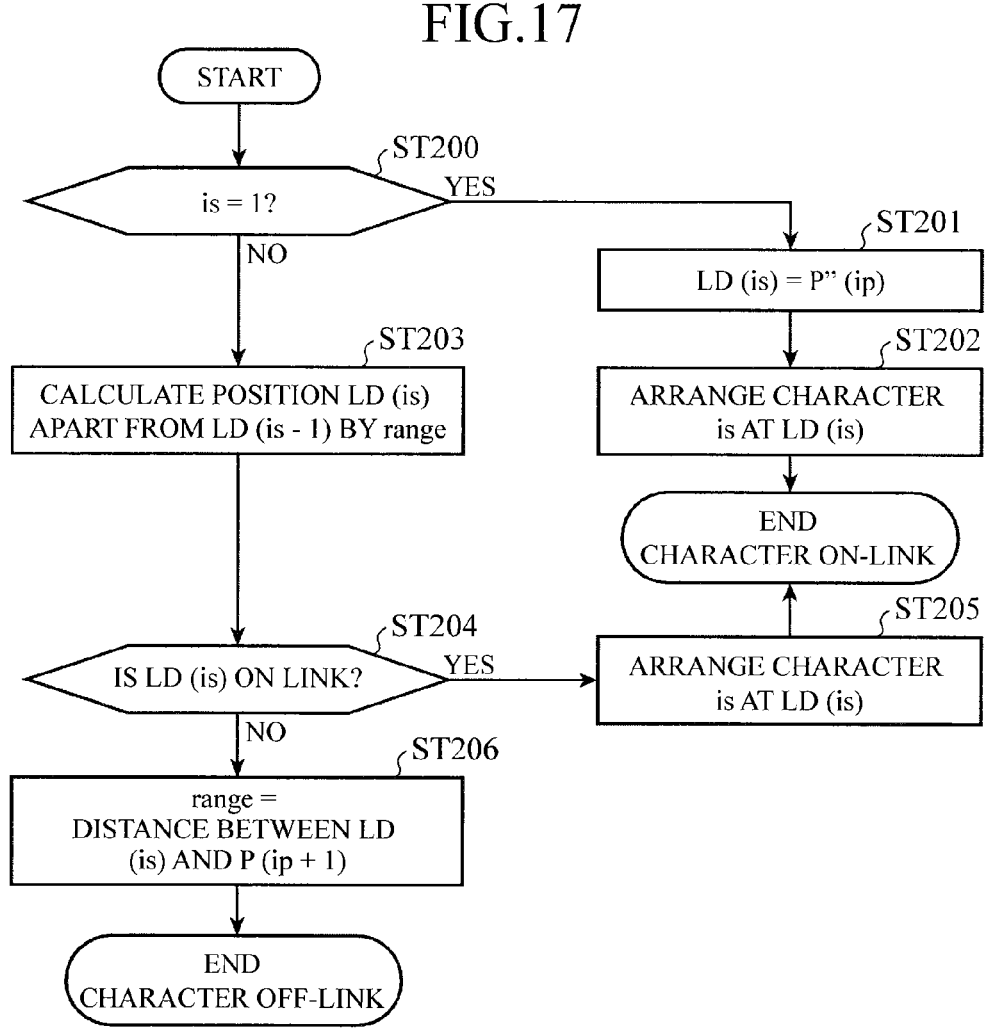
FIG. 17 is a flowchart showing the details of the character arrangement processing performed at the character arrangement unit of the string arrangement device in accordance with Embodiment 1 of this invention.

Then, the is-th character (hereinafter referred to as "character is") is arranged (Step ST185). Namely, the character arrangement unit 18 determines the arrangement of the "character is" based on the orientation θ' of the link and the character spacing "range." Here, the details of the character arrangement processing for determining the arrangement of the "character is" will be described by reference to a flowchart shown in FIG. 17.

In the character arrangement processing, first, it is examined whether is =1, or not (Step ST200). Namely, the initial character determination unit 23 determines whether the parameter "is" for showing the character to be arranged is 1, or not, namely, whether "is" is the first character or not. In Step ST200, if it is determined that is =1, the sequence shifts to the processing of arranging the "character is." In this example, in the initial state, is =1, and hence the sequence shifts to the processing of arranging the "character is."

In the processing of arranging the "character is," the character arrangement position determination unit 24 arranges the "character is" at the node P''' (1). Thus, the character arrangement processing is terminated as character on-link. More particularly, first, the lower-left coordinate LD (is) of the "character is" is set at the node P''' (1) (Step ST201). Namely, the character arrangement position determination unit 24 sets the lower-left coordinate LD (is) of the "character is" at the node P''' (1).

Then, the "character is" is arranged at LD (is) (Step ST202). Namely, the character arrangement position determination unit 24 arranges the "character is" at the lower-left coordinate LD (is) of the "character is." Here, the character arrangement represents the processing of setting the lower-left coordinate LD (is) of the "character is" at the node P''' (1), and then, setting the values determined by the following expression (8) at the upper left coordinate LT (is), the lower right coordinate RD (is), and the upper right coordinate RT (is) of the "character is." Incidentally, W (is) and H (is) in the expression (8) represent the transverse width and the longitudinal width of the "character is," respectively. In this example, it results that LD (1)=(0, 10), LT (1)=(0, 20), RD (1)=(5, 10), and RT (1)=(5, 20).

$$LT(is) = LD(is) + H(is)\begin{pmatrix} \cos(\theta' + 90°) \\ \sin(\theta' + 90°) \end{pmatrix}^T \quad (8)$$

$$RD(is) = LD(is) + W(is)\begin{pmatrix} \cos\theta' \\ \sin\theta' \end{pmatrix}^T$$

$$RT(is) = RD(is) + H(is)\begin{pmatrix} \cos(\theta' + 90°) \\ \sin(\theta' + 90°) \end{pmatrix}^T$$

In Step ST200, if it is determined that "is" is not equal to 1, there is calculated the lower-left coordinate LD (is) at the position apart from the lower-left coordinate LD (is –1) of the "character is –1" by "range" (Step ST203). Then, it is examined whether the lower-left coordinate LD (is) of the "character is" is on link, or not (Step ST204). In Step ST204, if it is determined that the lower-left coordinate LD (is) of the "character is" is on link, the "character is" is arranged at the lower-left coordinate LD (is) of the "character is" (Step ST205). Namely, the character arrangement position determination unit 24 arranges the "character is" at the lower-left coordinate LD (is) of the "character is." Thus, the character arrangement processing is terminated as character on-link.

In Step ST204, if it is determined that the lower-left coordinate LD (is) of the "character is" is not on link, the distance between the lower-left coordinate LD (is) of the "character is" and the node P (ip+1) is set as "range" (Step ST206). Then, the character arrangement processing is terminated as character off-link.

Figure 16:
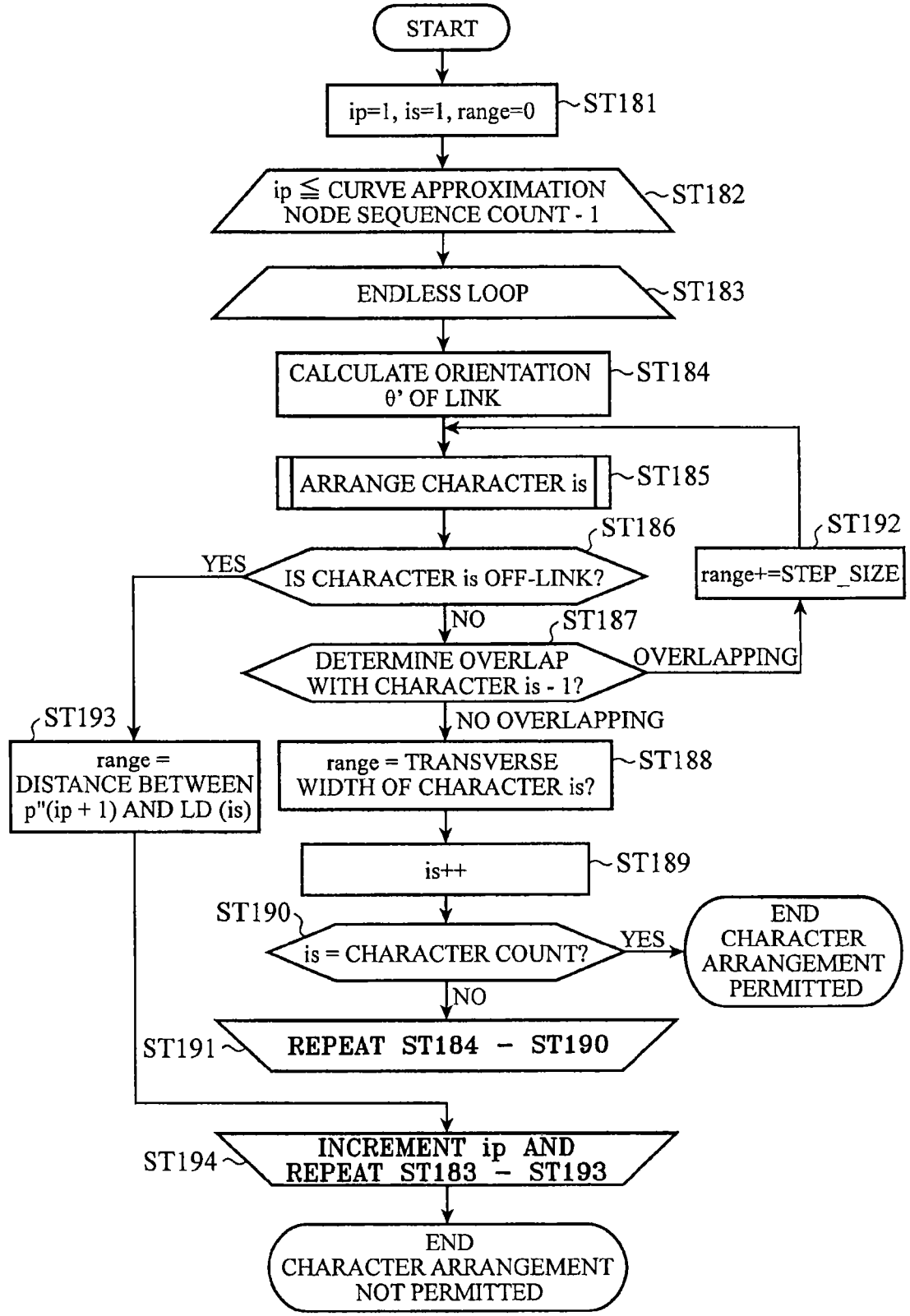
FIG. 16 is a flowchart showing the character arrangement processing performed at the character string arrangement calculation unit of the string arrangement device in accordance with Embodiment 1 of this invention.

Upon termination of the character arrangement processing, then, as shown in FIG. 16, it is examined whether the "character is" is off-link or not (Step ST186). Namely, the character off-link determination unit 19 determines whether the arrangement result at the character arrangement position determination unit 24 is character off-link or not. In Step ST186, if it is determined that the "character is" in the link, the determination of overlap with the "character is −1" is performed (Step ST187). Namely, the overlap determination unit 20 determines whether the "character is" and the "character is −1" overlap each other or not.

In Step ST187, if it is determined that there is no overlap, then, the "range" is set at the transverse width of the "character is" (Step ST188). Namely, the parameter renewing unit 21 sets the "range" at the transverse width of the "character is." Then, 1 is added to "is" (Step ST189). Namely, the parameter renewing unit 21 adds 1 to "is." In this example, it results that range=5, and that is =2.

Then, it is examined whether is =character count or not (Step ST190). Namely, the character count determination unit 22 examines whether "is" is equal to the character count or not. In Step ST190, if it is determined that is =character count, the character string arrangement processing is terminated as character string arrangement "permitted." On the other hand, in Step ST190, if it is determined that "is" is not equal to character count, the sequence proceeds to Step ST191, and it is determined that the sequence is within the endless loop. Therefore, hereinafter, the processes between Step ST183 and Step ST191, in other words, the arrangement of the "character is" by the character arrangement unit 18 is repeated.

In Step ST186, if it is determined that the "character is" is off-link, the "range" is set at the distance between the node P''' (ip+1) and the lower-left coordinate LD (is) (Step ST193). Namely, the parameter renewing unit 21 sets the "range" at the distance between the node P''' (ip+1) and the lower-left coordinate LD (is). Then, the sequence proceeds to Step ST194, and comes out of the endless loop. Hereinafter, at Step ST194, ip is incremented, and the processes between Step ST182 and Step ST194 are repeated.

In the second processing within the endless loop, is =2≠character count. For this reason, the character arrangement unit 18 shifts to processing of arranging the "character is." With this processing, in Step ST200, it is determined that "is" is not equal to 1. In this case, is =2. For this reason, the lower-left coordinate LD (is) of the "character is" is determined by the character lower-left coordinate calculation unit 25. Namely, the character lower-left coordinate calculation unit 25 determines the position apart from the lower-left coordinate LD (is −1) of the "character is −1" by the "range" with the following equation (9), and sets the determined value as the lower-left coordinate LD (is) of the "character is." In this case, θ'=0°, and range=5, so that LD (2)=LD (1)+(range, 0)=(5, 10).

$$LD(is) = LD(is - 1) + range\begin{pmatrix} \cos\theta' \\ \sin\theta' \end{pmatrix} \quad (9)$$

The lower-left coordinate LD (2) of the character 2 (second character) is present on the link (P''' (1), P''' (2)). For this reason, the character arrangement position determination unit 24 calculates the upper left coordinate LT (2), the lower right coordinate RD (2), and the upper right coordinate RT (2), other than the lower-left coordinate LD (2), in the same manner as the above. Then, the processing is terminated as character on-link. In this case, it results that LT (2)=(5, 20), RD (2)=(10, 10), and RT (2)=(10, 20), so that the processing is terminated as character on-link.

Figure 18:
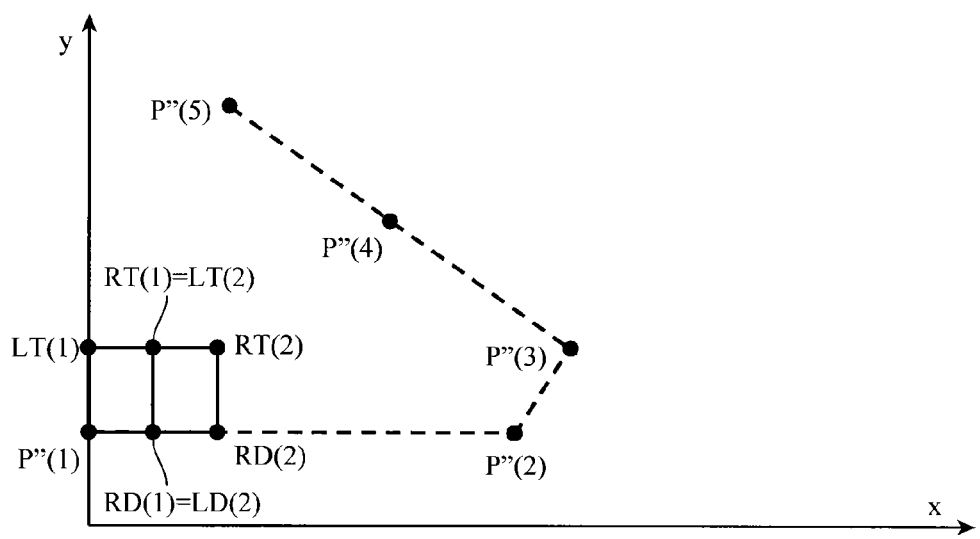
FIG. 18 is a view for illustrating character arrangement processing performed in the string arrangement device in accordance with Embodiment 1 of this invention.

Then, in Step ST186, the character off-link determination unit 19 determines that the "character is" is inside link. Then, in Step ST187, the overlap determination unit 20 determines the overlap with the "character is −1." In this case, as shown in FIG. 18, the right-hand side of the "character is −1" (RT (1), RD (1)) and the left-hand side of the "character is" (LT (2), LD (2)) overlap each other. Therefore, in Step ST187, it is determined that overlap occurs, so that STEP_SIZE is added to the "range" (Step ST192). Then, the sequence returns to Step ST185, and the character arrangement unit 18 arranges the character again. In this case, it results that range=5+1=6.

In the processing of arranging the character again, the character arrangement unit 18 arranges the character 2 in the same manner as described above. First, the initial character determination unit 23 determines whether is =1, or not. Then, is≠1, and hence, the character lower-left coordinate calculation unit 25 calculates the lower-left coordinate LD (2) of the character 2. In this case, θ'=0°, and range=6, so that LD (2)=LD (1)+(range, 0)=(6, 10). (6, 10) is on the link (P''' (1), P''' (2)), and hence the character arrangement position determination unit 24 calculates LT (2), RD (2), and RT (2) in the same manner as the above. In this case, it results that LT (2)=(6, 20), RD (2)=(11, 10), and RT (2) (11, 20), so that the processing is terminated as character on-link.

Figure 19:
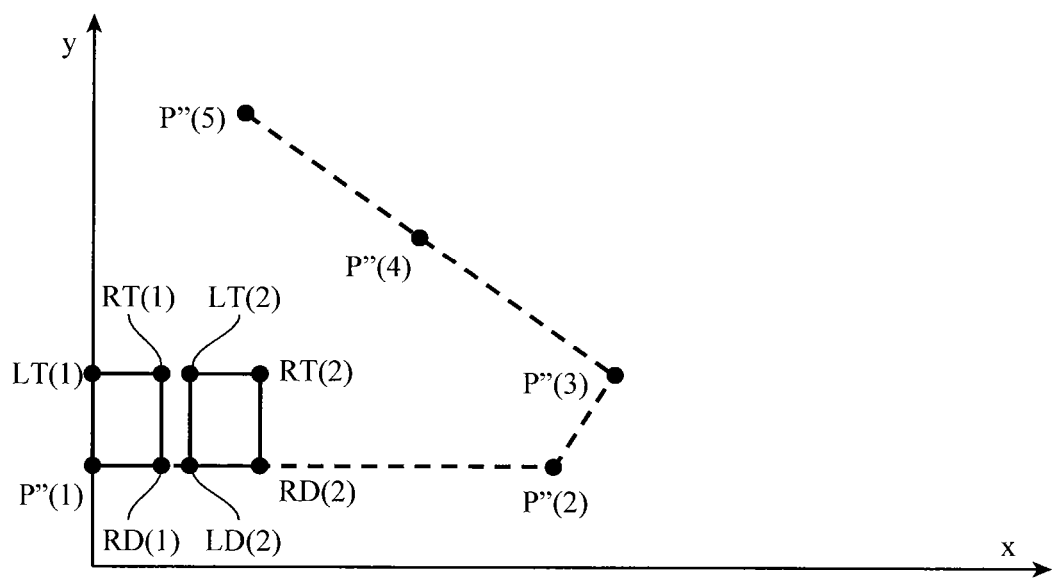
FIG. 19 is a view for illustrating the character arrangement processing performed in the string arrangement device in accordance with Embodiment 1 of this invention.

Then, the overlap determination unit 20 determines the overlap between the "character is" and the "character is −1." In this case, as shown in FIG. 19, the character 2 and the character 1 do not overlap each other. Accordingly, the sequence shifts to processing of updating the parameters at the parameter renewing unit 21. Updating of the parameters in the same manner as the above results in range=5, and is =3. Then, the character count determination unit 22 determines whether is =the number of characters or not in the same manner as the above. In this case, is≠ character count, and hence the sequence shifts to processing of arranging the character string.

Figure 20:
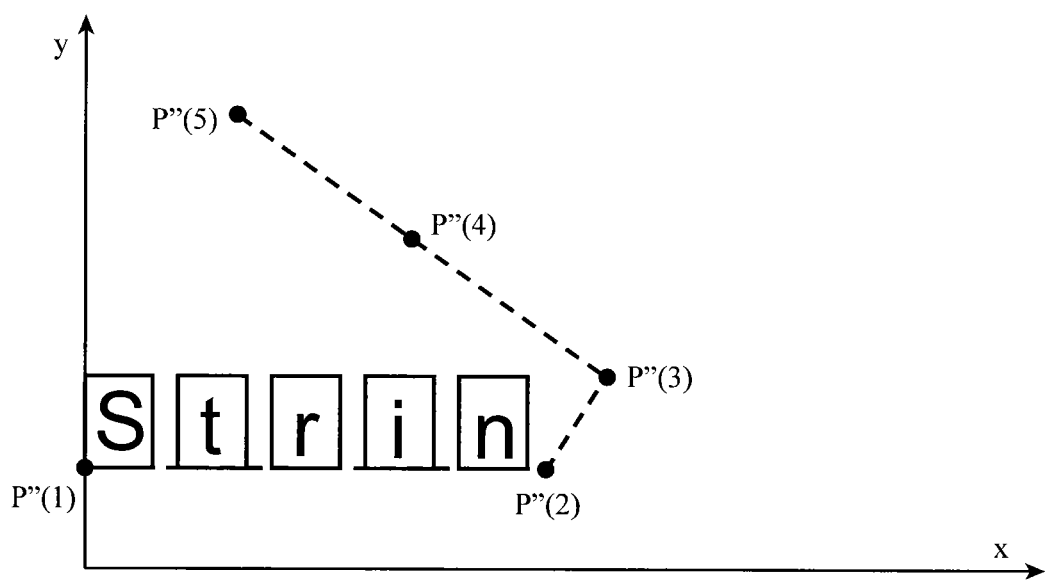
FIG. 20 is a view for illustrating the character string arranged by the character arrangement processing performed in the string arrangement device in accordance with Embodiment 1 of this invention.

Hereinafter, the characters 3, 4, and 5 are arranged in the same manner, so that the character string as shown in FIG. 20 is arranged. The circumscribed rectangle of the character 3 includes LD (3)=(12, 10), LT (3)=(12, 20), RD (3)=(17, 10), and RT (3)=(17, 20). The circumscribed rectangle of the character 4 includes LD (4)=(18, 10), LT (4)=(18, 20), RD (4)=(23, 10), and RT (4)=(23, 20). The circumscribed rectangle of the character 5 includes LD (5)=(24, 10), LT (5)=(24, 20), RD (5)=(29, 10), and RT (5)=(29, 20).

Figure 21:
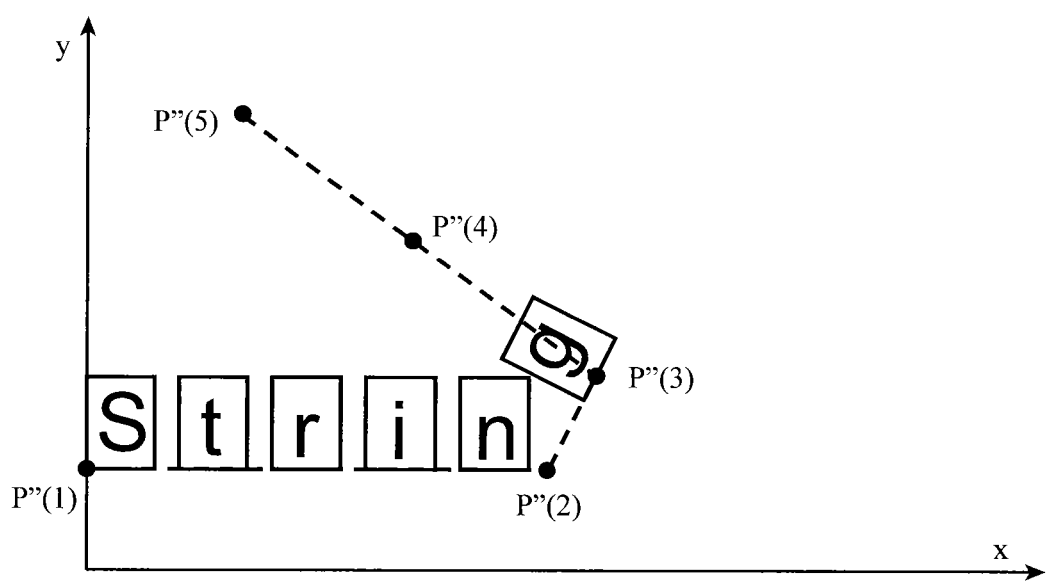
FIG. 21 is a view for illustrating the character string arranged by the character arrangement processing performed in the string arrangement device in accordance with Embodiment 1 of this invention.

Then, a character 6 is arranged on the link (P''' (1), P''' (2)). First, the initial character determination unit 23 determines whether is =1, or not. In this case, is =6. Accordingly, the character lower-left coordinate calculation unit 25 calculates the lower-left coordinate of the character. Calculation of the character lower-left coordinate in the same manner as described above results in the lower-left coordinate LD (6)= (34, 10). The lower-left coordinate LD (6) is off-link (P''' (1), P''' (2)). Accordingly, the "range" is renewed to a distance between the lower-left coordinate LD (6) and the node P''' (2) of 4, and ip is renewed from 1 to 2. Thus, the processing is terminated as character off-link. Then, the processing was terminated as character off-link, and hence the character is arranged on the next link. In this case, the character 6 is arranged on the link (P''' (2), P''' (3)). The arrangement of the character by the same processing as the foregoing processing results in the circumscribed rectangle of the character 6 including LD (6)=(34.02, 18.05), LT (6)=(25.05, 22.52), RD (6)=(36.26, 22.52), and RT (6)=(27.31, 26.99). FIG. 21 shows the results of the arrangement of the character string "String". With the aforementioned manner, the character string is arranged on the road links.

As described above, when the character string is arranged on the straight line approximating the curve created from the road links, the character string can be arranged so that the character arrangement angular change is smaller than in the conventional. As a result, the character angular change can be reduced as compared with the conventional, and hence the character string can be recognized with ease. Further, since it is configured that the curve created from the road links is approximated to the plurality of straight lines, it is possible to omit the calculation of the distance on the curve in determination of the character position, which enables the character position to be determined at a higher speed as compared with the technology disclosed in Patent Document 1.

It is noted that in the invention, it is possible to modify any component of the embodiments, or omit any component in the embodiments within the scope of the invention.

INDUSTRIAL APPLICABILITY

This invention can improve the readability of the character string, and can perform the positioning of the character at a higher speed, and hence it is suitable for a map display performed in a car navigation system, portable equipment, or the like.

EXPLANATION OF REFERENCE NUMERALS

1: Character string arrangement data storage unit, 2: Character string arrangement data acquisition unit, 3: Road node sequence thinning unit, 4: Control point sequence creation unit, 5: Curve approximation unit, 6: Curve approximation node sequence storage unit, 7: Curve approximation node registration unit, 8: Straight line determination unit, 9: Midpoint-on-curve creation unit, 10: First-half curve approximation unit, 11: Latter-half curve approximation unit, 12: Single straight line approximation unit, 13a: Character string arrangement processing unit, 13: Curve approximation node sequence acquisition unit, 14: Character string arrangement calculation unit, 15: Character string arrangement registration unit, 16: Output character string arrangement storage unit, 17: Link angle calculation unit, 18: Character arrangement unit, 19: Character off-link determination unit, 20: Overlap determination unit, 21: Parameter renewing unit, 22: Character count determination unit, 23: Initial character determination unit, 24: Character arrangement position determination unit, 25: Character lower-left coordinate calculation unit, 26: Next character arrangement distance renewing unit.

The invention claimed is:

1. A string arrangement device, comprising:
a character string arrangement data acquisition unit configured to acquire character string arrangement data including a road node sequence having an angular change Θ of links which is along a road of a map;
a control point sequence creation unit configured to create a control point sequence from the road node sequence included in the character string arrangement data acquired by the character string arrangement data acquisition unit;
a curve approximation unit configured to create a node sequence having an angular change of links which is smaller than the angular change Θ along a straight line obtained by approximating a curve based on the control point sequence created by the control point sequence creation unit;
a curve approximation node sequence storage unit configured to store the node sequence created by the curve approximation unit as a curve approximation node sequence; and
a character string arrangement processor configured to perform a process of arranging, on the map, the character string along a link connecting the curve approximation node sequence stored in the curve approximation node sequence storage unit.

2. The string arrangement device according to claim 1, further comprising:
a road node sequence thinning unit configured to thin out some of the nodes forming the road node sequence included in the character string arrangement data acquired by the character string arrangement data acquisition unit, wherein the control point sequence creation unit creates the control point sequence from the road node sequence after thinning out by the road node sequence thinning unit.

3. The string arrangement device according to claim 1, wherein the curve approximation unit includes:
a straight line determination unit configured to determine whether the curve from the control point sequence created by the control point sequence creation unit can be approximated with a straight line or not;
a midpoint-on-curve creation unit configured to, when it is determined that approximation cannot be performed with a straight line by the straight line determination unit, create a midpoint on the curve from the control point sequence created by the control point sequence creation unit;
a first-half curve approximation unit configured to output a node sequence created by approximating with a straight line the curve, which precedes the midpoint created by the midpoint-on-curve creation unit, out of the curve from the control point sequence from the control point sequence creation unit;
a latter-half curve approximation unit configured to output a node sequence created by approximating with a straight line the curve, which follows the midpoint created by the midpoint-on-curve creation unit, out of the curve from the control point sequence from the control point sequence creation unit, with this node sequence being connected to the node sequence created from approximation with a straight line by the first-half curve approximation unit,
a single straight line approximation unit configured to, when it is determined that approximation can be performed with a straight line by the straight line determination unit, output a node sequence created by approximating the curve from the control point sequence created at the control point sequence creation unit with one straight line, and
a curve approximation node registration unit configured to register in a curve approximation node sequence storage unit the node sequence from the latter-half curve approximation unit, or the node sequence from the single straight line approximation unit as a curve approximation node sequence.

4. The string arrangement device according to claim 1, wherein the character string arrangement processor includes:
a curve approximation node sequence acquisition unit configured to acquire the node sequence, along which the character string extends, from the curve approximation node sequence storage unit;
a character string arrangement calculation unit configured to calculate an arrangement position of the character string based on the curve approximation node sequence acquired by the curve approximation node sequence acquisition unit;

an output character string arrangement storage unit configured to store the arranged position of the character string; and a character string arrangement registration unit configured to register in the output character string arrangement storage unit the arrangement position of the character string calculated by the character string arrangement calculation unit.

5. The string arrangement device according to claim 4, wherein the character arrangement unit includes:

an initial character determination unit configured to determine whether the character arranged based on the link angle calculated by the link angle calculation unit is the first character in the character string or not;

a character lower-left coordinate calculation unit configured to calculate a lower-left coordinate of the character according to a determination result by the initial character determination unit;

a character arrangement position determination unit configured to determine an arrangement position of the character according to a determination result by the initial character determination unit or the lower-left coordinate of the character calculated at the character lower-left coordinate calculation unit; and a next character arrangement distance renewing unit configured to determine a distance to a next character based on the lower-left coordinate of the character calculated at the character lower-left coordinate calculation unit.

6. A string arrangement method comprising:

acquiring character string arrangement data including a road node sequence having an angular change $\theta$ of links which is along a road of a map;

creating a control point sequence from the road node sequence of the road included in the character string arrangement data acquired in the character string arrangement acquiring step;

creating a node sequence having an angular change of links which is smaller than the angular change $\theta$ along a straight line obtained by approximating a curve based on the control point sequence created by the control point sequence creating step;

storing the node sequence as a curve approximation node sequence; and arranging, on the map, the character string along a link connecting the curve approximation node sequence stored in the curve approximation node sequence storing step to provide improved readability.

7. The string arrangement method according to claim 6, further comprising:

thinning out some of the nodes forming the road node sequence included in the character string arrangement data acquired by the character string arrangement data acquiring step, wherein the control point sequence creating step creates the control point sequence from the road node sequence after the thinning step.

* * * * *